(12) United States Patent
Yagisawa et al.

(10) Patent No.: US 7,275,133 B2
(45) Date of Patent: *Sep. 25, 2007

(54) STORAGE SYSTEM

(75) Inventors: Ikuya Yagisawa, Tokyo (JP); Naoto Matsunami, Hayama (JP); Akihiro Mannen, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 10/988,496

(22) Filed: Nov. 16, 2004

(65) Prior Publication Data

US 2005/0071525 A1    Mar. 31, 2005

Related U.S. Application Data

(63) Continuation of application No. 10/419,096, filed on Apr. 21, 2003, now Pat. No. 7,047,354.

(30) Foreign Application Priority Data

Feb. 17, 2003  (JP)  ............................. 2003-037602

(51) Int. Cl.
    *G06F 13/00*    (2006.01)
(52) U.S. Cl. .................................................. 711/114
(58) Field of Classification Search ................ 711/114, 711/112
    See application file for complete search history.

(56) References Cited

U.S. PATENT DOCUMENTS 5,423,046 A   6/1995  Nunnelley et al.
5,546,558 A   8/1996  Jacobson et al.
5,603,003 A   2/1997  Akizawa et al.

(Continued)

FOREIGN PATENT DOCUMENTS

EP    0795824    9/1997

(Continued)

OTHER PUBLICATIONS

D. Gibson, et al A case for Redundant Arrays of Inexpensive Disks (RAID), Computer Science Division Department of Ele-ctrical Engineering and Computer Sciences, Univeristy of Berkeley.

(Continued)

*Primary Examiner*—Kevin L. Ellis
(74) *Attorney, Agent, or Firm*—Mattingly, Stanger, Malur & Brundidge, P.C.

(57) ABSTRACT

A disk array includes a drive management unit, which is a program for identifying kinds of disk devices and managing different disk devices separately, and a drive management table for storing information to be utilized by the drive management unit. The disk array further includes a program for managing accumulated time of disk devices. The program includes a drive lifetime setting portion for setting lifetimes of drives, a drive start/stop portion for intentionally starting/stopping ATA disk devices, and an operation time measurement portion for measuring accumulated operation time. Since it is necessary to be conscious of difference in reliability and performance among disk devices when forming a RAID, a drive kind notification unit, which is a program for notifying of the kind of a disk device when forming the RAID, is provided.

24 Claims, 17 Drawing Sheets

U.S. PATENT DOCUMENTS

| | | | |
|---|---|---|---|
| 5,805,788 | A | 9/1998 | Johnson |
| 5,812,754 | A | 9/1998 | Lui et al. |
| 5,838,891 | A | 11/1998 | Mizuno et al. |
| 5,845,319 | A | 12/1998 | Yorimitsu |
| 5,848,282 | A | 12/1998 | Kang et al. |
| 5,867,736 | A | 2/1999 | Jantz |
| 5,884,098 | A | 3/1999 | Mason, Jr. |
| 5,951,691 | A | 9/1999 | Ng et al. |
| 6,108,748 | A | 8/2000 | Ofek et al. |
| 6,115,797 | A | 9/2000 | Kanda et al. |
| 6,173,360 | B1 | 1/2001 | Beardsley et al. |
| 6,219,752 | B1 | 4/2001 | Sekido |
| 6,223,249 | B1 | 4/2001 | Kato et al. |
| 6,282,602 | B1 * | 8/2001 | Blumenau et al. ............. 711/4 |
| 6,510,491 | B1 | 1/2003 | Franklin et al. |
| 6,549,978 | B2 | 4/2003 | Mansur et al. |
| 6,553,408 | B1 | 4/2003 | Merrell et al. |
| 6,606,690 | B2 | 8/2003 | Padovano |
| 6,636,934 | B1 | 10/2003 | Linnell |
| 6,651,137 | B2 | 11/2003 | Baek et al. |
| 6,708,232 | B2 | 3/2004 | Obara |
| 6,763,409 | B1 * | 7/2004 | Elliott .......................... 710/74 |
| 6,772,365 | B1 | 8/2004 | Obara |
| 6,834,326 | B1 | 12/2004 | Wang et al. |
| 2002/0007469 | A1 | 1/2002 | Taketa et al. |
| 2002/0040413 | A1 | 4/2002 | Okada et al. |
| 2002/0062387 | A1 | 5/2002 | Yatziv |
| 2002/0062454 | A1 | 5/2002 | Fung |
| 2002/0069317 | A1 | 6/2002 | Chow et al. |
| 2002/0069334 | A1 | 6/2002 | Hsia et al. |
| 2002/0138705 | A1 | 9/2002 | Suzuki et al. |
| 2002/0147945 | A1 | 10/2002 | Fox et al. |
| 2002/0162048 | A1 * | 10/2002 | Ackaret et al. ................. 714/6 |
| 2003/0031187 | A1 | 2/2003 | Heffernan et al. |
| 2003/0097504 | A1 | 5/2003 | Oeda et al. |
| 2003/0097607 | A1 | 5/2003 | Bessire |
| 2003/0115437 | A1 | 6/2003 | Tomita |
| 2003/0135577 | A1 | 7/2003 | Weber et al. |
| 2003/0145167 | A1 | 7/2003 | Tomita |
| 2003/0163639 | A1 | 8/2003 | Baum et al. |
| 2003/0189811 | A1 | 10/2003 | Peeke et al. |
| 2003/0196002 | A1 | 10/2003 | Nakayama et al. |
| 2003/0196147 | A1 | 10/2003 | Hirata et al. |
| 2003/0204671 | A1 | 10/2003 | Matsunami et al. |
| 2003/0221061 | A1 | 11/2003 | El-Batal et al. |
| 2003/0221077 | A1 | 11/2003 | Ohno et al. |
| 2004/0010660 | A1 | 1/2004 | Konshak et al. |
| 2004/0010662 | A1 | 1/2004 | Aruga |
| 2004/0024930 | A1 | 2/2004 | Nakayama et al. |
| 2004/0034731 | A1 | 2/2004 | Sivertsen |
| 2004/0068610 | A1 | 4/2004 | Umberger et al. |
| 2004/0073747 | A1 | 4/2004 | Lu |
| 2004/0078707 | A1 | 4/2004 | Apperley et al. |
| 2004/0107325 | A1 | 6/2004 | Mori |
| 2004/0117517 | A1 | 6/2004 | Beauchamp et al. |
| 2004/0128627 | A1 | 7/2004 | Zayas |
| 2004/0148460 | A1 | 7/2004 | Steinmetz et al. |
| 2004/0177218 | A1 | 9/2004 | Meehan et al. |
| 2004/0193760 | A1 | 9/2004 | Matsunami et al. |
| 2004/0193791 | A1 | 9/2004 | Felton et al. |
| 2004/0199515 | A1 | 10/2004 | Penny et al. |
| 2004/0221101 | A1 | 11/2004 | Voorhees et al. |
| 2005/0097132 | A1 | 5/2005 | Cochran et al. |
| 2005/0117468 | A1 | 6/2005 | Kano et al. |
| 2005/0120263 | A1 | 6/2005 | Kano et al. |
| 2005/0120264 | A1 | 6/2005 | Kano et al. |
| 2005/0138154 | A1 | 6/2005 | Seto |
| 2005/0154942 | A1 | 7/2005 | Kano et al. |

FOREIGN PATENT DOCUMENTS

| | | |
|---|---|---|
| EP | 0844561 | 5/1998 |
| EP | 1315074 | 5/2003 |
| JP | 9120342 | 5/1997 |
| JP | 9330182 | 12/1997 |
| JP | 10301720 | 11/1998 |
| JP | 2002150746 | 5/2002 |
| JP | 2002-33954 | 11/2002 |

OTHER PUBLICATIONS

EMC 2-Gigabit Disk-Array Enclosure EMC Corporation (DAE2), FC and ATA Models, Hardware Reference P/N 014003048, Rev A02.

Serial Attached SCSI and Serial ATA Compatibility, Intel, 2002, pp. 1-8.

ESG Product Brief EMC, Mar. 2003, CIARiiOn With ATA, pp. 1-2.

EMC CLARiiON Backup Storage Solutions Back-up-to-Disk Guide with LEGATO Networker Diskbackup Option (DBO), Engineering White Paper, Apr. 8, 2003, pp. 1-28.

EMC CLARiiON BAckup Storage Solutions Backup-to-disk Guide with Computer Associates BrightStor ARCserve Backup, Engineering White Paper, Apr. 16, 2003, pp. 1-28.

EMC CLARiiON Backup Storage Solutions Backup-to-Disk: An Overview, Engineering White Paper, Mar. 3, 2003, pp. 1-10.

EMC CLARiiON BAckup Storage Solutions Backup-to-Disk Guide with CommVault Galaxy, Engineering White Paper, Mar. 3, 2003, pp. 1-26.

EMC CLARiiON BAckup Storage Solutions Backup-to-Disk Guide with Computer Associates BrightStor Enterprise Backup, Engineering White Paper, Apr. 16, 2003, pp. 1-23.

SGI InfiniteStorage TP9300S Storage Array, Data Sheet, available at: http://www.sgi.com/pdfs/3643.pdf.

Adaptec FS4500 Fibre to SATA RAID, Data Sheet, available at: http://www.sunstarco.com/PDF%20Files/Adaptec%20FS4500%20SATA.pdf.

Infortrend EonStor A16F-R1211/S1211 FC-to-SATA RAID Subsystem product information, available at: http://www.infortrend.com/2_2product/a61f-r(s)1211.asp.

Synetic Inc., SyneRAID -800SA, SCSI/Fibre-toSATA RAID Subsystem product information, available at: http://www.synetic.net/Synetic-Products/SyneRAID-Units/SyneRAID-800SATA/SyneRAID-800SA.html.

"SATA Disk System and Expansion of Unit offer 3.5 TB storage", Product News Network, Nov. 1, 2004.

Judd, Ian, "Device Services Interface", Online, Accredited Standards Committee, X3, Information Processing Systems, Jun. 19, 1996, pp. 1-8.

"Veritas Volume Manager Storage Administrator 3.2, Administrator's Guide", Online, Veritas Softwar Corporation, Jul. 2001, pp. 1-184.

INFOSTOR, The Leading Source for Enterprise Storage Professionals, vol. 6, No. 12, Dec. 2002, "Disk-based backup options multiply", cover page, p. 14 and p. 16.

EMC CLARiiON Backup Storage Solutions CX Series Backup-to-Disk Guide, published 2003.

Serial Attached SCSI and Serial ATA Compatibility, SCSI Trade Association, Sep. 28, 04, pp. 1-8.

\* cited by examiner

FIG.2

| DRIVE NO. | DRIVE TYPE | ARRAY CONFIGURATION | USE | START/STOP | ACCUMULATED ACTIVE TIME | LIFETIME SETTING | REMAINING LIFETIME | AUTOMATIC MIGRATION SPECIFICATION |
|---|---|---|---|---|---|---|---|---|
| 0 | FC | (1) RAID5 | DB | ON | 10000hr | 40000hr | 30000hr | 0 |
| 1 | FC | (1) RAID5 | DB | ON | 10000hr | 40000hr | 30000hr | 0 |
| 2 | FC | (1) RAID5 | DB | ON | 10000hr | 40000hr | 30000hr | 0 |
| 3 | ATA | (2) RAID5 | FS | ON | 23000hr | 25000hr | 2000hr | 1 |
| 4 | ATA | (2) RAID5 | FS | ON | 23000hr | 25000hr | 2000hr | 1 |
| 5 | ATA | (2) RAID5 | FS | ON | 23000hr | 25000hr | 2000hr | 1 |

| LU NO. | HOST ASSIGNMENT SITUATION | SCSI ID | LUN | CAPACITY | LU TYPE | LU REMAINING LIFETIME | DRIVE NO. LIST | EVALUATION VALUE |
|---|---|---|---|---|---|---|---|---|
| 0 | ASSIGNED | 2 | 1 | 50GB | FC | 40000hr | 0,1,2 | 99999 |
| 1 | NOT ASSIGNED | — | — | 50GB | FC | 40000hr | 0,1,2 | 0 |
| 2 | ASSIGNED | 3 | 1 | 50GB | ATA | 10000hr | 3,4,5 | 99999 |
| 3 | NOT ASSIGNED | — | — | 50GB | ATA | 10000hr | 3,4,5 | 0 |

FIG.11

| LU PAIR NO. | COPY SOURCE LU INFORMATION | | | COPY DESTINATION LU INFORMATION | | | PAIR STATE |
|---|---|---|---|---|---|---|---|
| | LU NO. | PAIR ATTRIBUTE | LU TYPE | DEVICE ID | LU NO. | LU TYPE | |
| 0 | 100 | LOCAL | FC | DISK ARRAY A | 200 | FC | Pair |
| 1 | 110 | LOCAL | FC | DISK ARRAY A | 210 | ATA | Pair |
| 2 | 120 | LOCAL | ATA | DISK ARRAY A | 220 | ATA | Split |
| 3 | 130 | REMOTE | FC | DISK ARRAY B | 230 | FC | Pair |
| 4 | 140 | REMOTE | ATA | DISK ARRAY B | 240 | ATA | Split |
| 246a | 246b | 246c | 246d | 246e | 246f | 246g | 246h |

246

| SUBJECT DEVICE NO. | DEVICE ID | IP ADDRESS |
|---|---|---|
| 1 | DISK ARRAY A | 100.100.100.100 |
| 2 | DISK ARRAY B | 100.100.100.101 |

FIG.14

| EVALUATION ITEM | EVALUATION COLUMN IN LU MANAGEMENT TABLE | INPUT CONDITION READING WITH EXPRESSION CHANGED | PENALTY AT THE TIME OF CONDITION SATISFACTION | PENALTY AT THE TIME OF CONDITION UNSATISFACTION |
|---|---|---|---|---|
| TYPE | LU TYPE | N/A | 0 | +100 |
| CAPACITY | CAPACITY | N/A | +2 PER GB | +99999 |
| USE | LU TYPE | "DB" = "FC", "FS" = "ATA" | 0 | +10 |
| REMAINING LIFETIME | LU REMAINING LIFETIME | N/A | 0 | +100 PER HR |
| PERFORMANCE | LU TYPE | "FC" AT 90MB/S OR MORE | 0 | +50 |
| PRICE | LU TYPE | "ATA" AT $5/GB OR LESS | 0 | +30 |
| LU OPERATION | LU TYPE | "BACKUP" = "ATA" | 0 | +1000 |
| LU OPERATION | LU REMAINING LIFETIME | "BACKUP" = 1000 HR OR LESS | 0 | +1000 PER HR |
| RELIABILITY | LU REMAINING LIFETIME | "HIGH" = 30000 HR OR MORE "MEDIUM" = 15000 HR OR MORE | 0 | +1000 |
| THE NUMBER OF COPY DESTINATIONS | LU TYPE | "1 TO 5" = THE SAME AS COPY SOURCE "6 OR MORE" = ATA | 0 | +1000 |

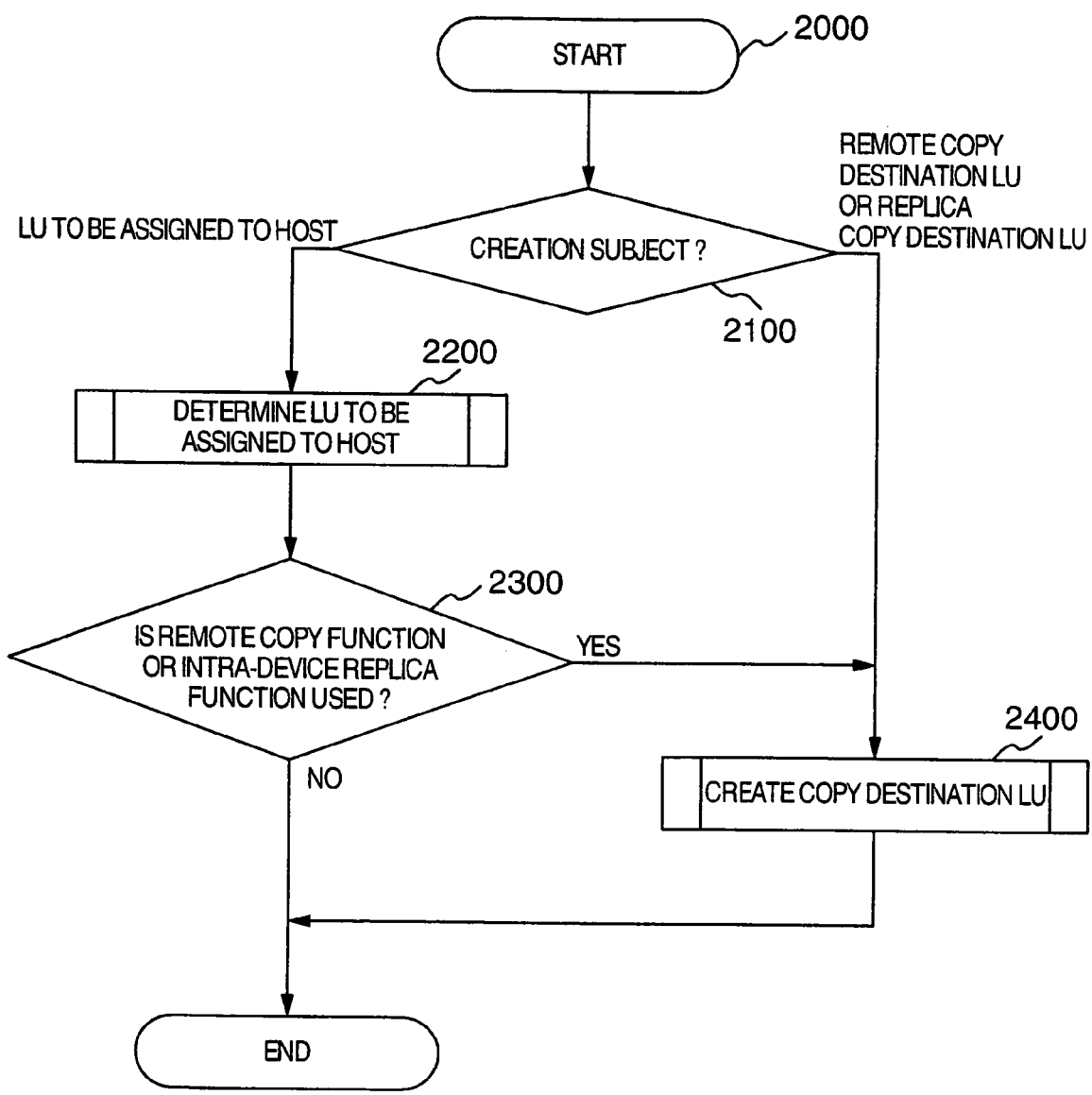

| WATERMARK NO. | DEVICE ID | MONITORING SUBJECT LU LIST | REMAINING LIFETIME WATERMARK |
|---|---|---|---|
| 1 | DISK ARRAY A | ALL LUS | 100hr |
| 2 | DISK ARRAY B | ALL LUS | 500hr |
| 3 | DISK ARRAY B | 0,1,2,3,4,5 | 1000hr |

13500a  13500b  13500c  13500d

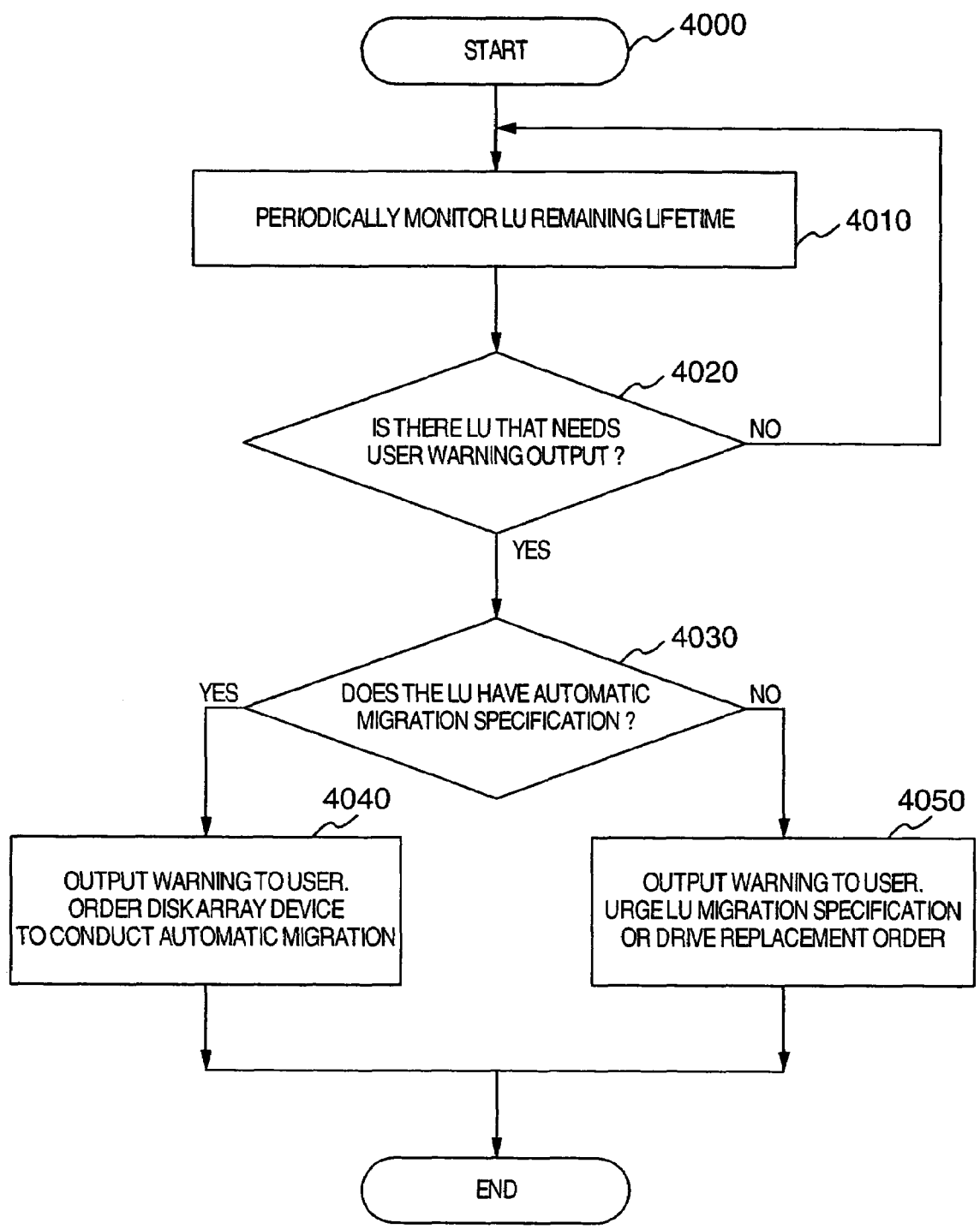

STORAGE SYSTEM

The present application is a continuation of application Ser. No. 10/419,096, filed Apr. 21, 2003 now U.S. Pat. No. 7,047,354, the contents of which are incorporated herein by reference.

BACKGROUND OF THE INVENTION

The present invention relates mainly to a control method for storage system and a storage system.

DESCRIPTION OF RELATED ART

As a kind of a storage system connected to a computer, there are disk arrays. Disk arrays are called RAID (Redundant Arrays of Inexpensive Disks). The disk array is a storage system including a plurality of disk devices arranged in an array form and a control unit for controlling them. In the disk array, read requests (data readout requests) and write requests (data write requests) are processed at high speed by parallel operation of disk devices, and redundancy is added to data. The disk arrays are classified into five levels in accordance with the kind and configuration of the added data, as disclosed in "A case for Redundant Arrays of Inexpensive Disks (RAID)", David A. Patterson, Garth Gibson, and Randy H. Katz, Computer Science Division Department of Electrical Engineering and Computer Sciences, University of California Berkeley. By the way, disk devices are storages having a hard disk, an optical magnetic disk, or the like.

On the other hand, in disk devices, there are some kinds differing in interface used for connection to other devices. For example, there are disk devices (hereafter referred to as FC disk devices) each having a fibre channel (hereafter referred to as FC) interface for which standardization work is being conducted by ANSI T11, and Advanced Technology Attachment disk devices (hereafter referred to as ATA disk devices) each having an ATA (Advanced Technology Attachment) interface for which standardization work is being conducted by ANSI T13.

ATA disk devices are comparatively inexpensive and used in desktop computers for homes. On the other hand, FC disk devices are used in business servers of which reliability is required. As compared with the ATA disk devices, therefore, the FC disk devices have higher processing performance in data input/output (hereafter referred to as I/O) and such higher reliability that they can withstand continuous operation over 24 hours on 365 days. In the case where these disk devices are used in storage systems such as disk arrays, disk devices are used properly sometimes in accordance with the performance, price or the like required of the disk array. For example, a technique of improving the reliability of data stored in a disk array by using a disk device that is higher in performance than a data storing disk device as a disk device for storing parities, which are redundant data, is disclosed in JP-A-10-301720.

SUMMARY OF THE INVENTION

In recent years, there is a demand that a data stored in disk devices in the hosts should be consolidated into one disk array in order to decrease the cost of data management. If the disk arrays are merely collected into one disk array physically, however, flexibility is impaired as compared with the case where a plurality of disk arrays differing in kind or performance are used. Therefore, there are increased demands that a more flexible array construction should be conducted while holding down the price of the disk array, by providing disk devices having high price, high reliability, and high performance and disk devices having low price and low reliability mixedly in one disk array and properly using the disk devices according to use.

In the conventional technique, however, it is difficult to unitarily manage the reliability of disk devices. Therefore, it has not been considered to provide mixedly disk devices differing in reliability of disk device itself, such as, for example, device lifetime, and construct and manage a storage system, such as a disk array.

Therefore, the present invention provides a storage system including a plurality of storages differing in reliability of storage itself, and a control unit connected to the storages. The control unit further includes an interface to which the storages are connected, and the control unit detects information concerning the reliability of each of the storages and manages the detected information. To be concrete, it is conceivable that the control unit detects a kind of each of the storages and thereby determines a lifetime (predetermined available time given by the storage type) of the storage. Furthermore, it is also conceivable that the control unit manages the detected lifetime of each of the storages and time when the storage has been used, and thereby manages a remaining available time (remaining lifetime) of the disk device.

Furthermore, the control unit in the storage system according to the present invention alters a use form of each of the storages according to its remaining lifetime. For example, if the remaining lifetime of a managed storage has become shorter than a certain predetermined time, then the storage is used for obtaining backup of data, or the use of the storage is stopped and replaced.

Furthermore, the control unit in the storage system according to the present invention previously determines use of each of the storages according to its available time. For example, storages each having a long available time are discriminated from storages each having a short available time. A group of storages each having a long available time are designated as usually used storages, whereas a group of storages each having a short available time are designated as storages for storing backup data.

Furthermore, the control unit in the storage system according to the present invention controls these storages on the basis of detected kinds of the storages. For example, the control unit issues a command peculiar to a storage according to the detected kind of the storage.

Furthermore, the control unit in the storage system according to the present invention may have a program for identifying kinds of storages and managing different storages separately, and a drive management table that stores management information.

Furthermore, the storage system according to the present invention, for example, sets a lifetime of each of the drives, intentionally start/stops each of ATA disk devices, and measures accumulated operation time.

Furthermore, a storage management server for managing an environment including a mixture of storage systems described above may also be provided.

Furthermore, the storage system conducts data duplication between storage systems or within the storage system, and assigns logical storage regions that become subjects of data duplication on the basis of lifetime management.

By the way, both logical storages and physical storages, such as disk devices, are included in "storages."

Other objects, features and advantages of the invention will become apparent from the following description of the embodiments of the invention taken in conjunction with the accompanying drawings.

BRIEF DESCRIPTION OF THE DRAWINGS

FIG. 2 is a diagram of a drive management table in the first embodiment;

FIG. 5 is a diagram showing an example of an LU management table in the first embodiment;

FIG. 11 is a diagram showing an example of an LU pair management table in the third embodiment;

FIG. 14 is a diagram showing an example of an LU evaluation item table in the third embodiment;

FIG. 15 is a flow chart of logical unit (LU) assignment processing in the third embodiment;

FIG. 20 is a flow chart of LU lifetime management processing in the third embodiment.

DETAILED DESCRIPTION OF THE EMBODIMENTS

Figure 1:
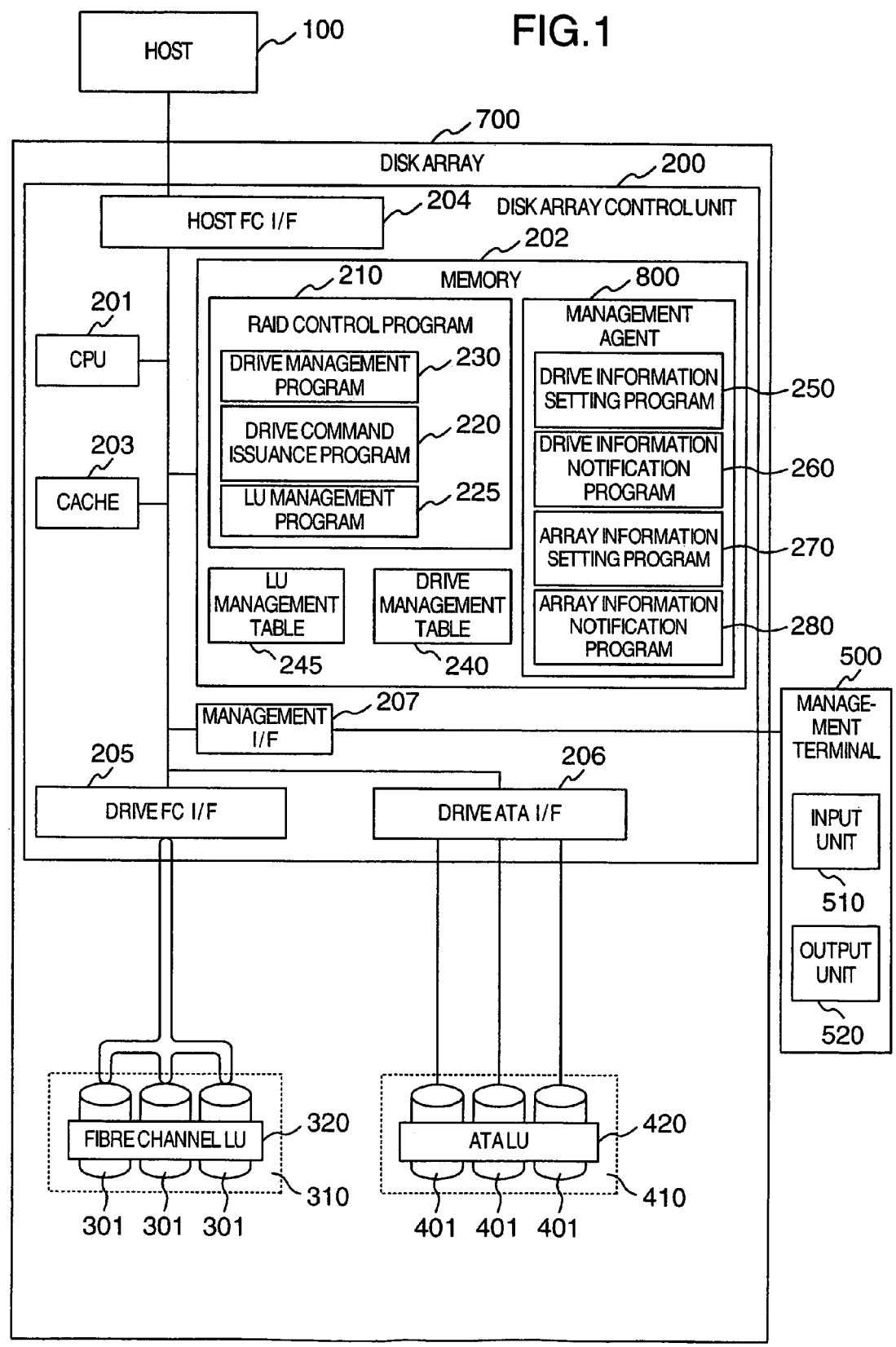
FIG. 1 is a system configuration diagram in a first embodiment of the invention.

FIG. 1 is a diagram showing a first embodiment of a storage system according to the present invention. A disk array 700, which is an example of a storage system, is connected to a computer (hereafter referred to as host) 100 and a management terminal 500. As for an interface used for connection to the host 100, an FC or a SCSI is conceivable. The disk array 700 includes a disk array control unit 200, an FC disk group 310, and an ATA disk group 410.

The FC disk group 310 includes a plurality of FC disk devices 301. The ATA disk group 410 includes a plurality of ATA disk devices 401. In the present embodiment, FC disk devices and ATA disk devices are exemplified. In application of the present invention, however, disk devices used in the disk array are not limited to these disk devices.

The management terminal 500 includes an input unit 510, such as a keyboard device, used by the user when inputting setting concerning the disk array 700, and an output unit 520, such as a display device, for showing information concerning the disk array 700 to the user.

The disk array control unit 200 includes a CPU 201 for executing a program to control the disk array 700, a memory 202, a cache 203 for temporarily storing input and output data of the host 100, a host FC I/F 204 for controlling data transmission and reception between the host 100 and the disk array control unit 200, a drive FC I/F 205 for controlling data transmission and reception between the FC disk group 310 and the disk array control unit 200, a drive ATA I/F 206 for controlling data transmission and reception between the ATA disk group 410 and the disk array control unit 200, and a management interface (I/F) 207 for controlling information transmission and reception between the management terminal 500 and the disk array control unit 200. These components are connected to each other via an internal bus.

The drive FC I/F 205 is connected to the FC disk group 310 via an FC. In the present embodiment, the fibre channel arbitration loop is used as a protocol for the FC. However, the protocol is not limited to this, but another protocol, such as the point-to-point or fabric of the FC, also may be used.

The drive ATA I/F 206 is connected to ATA disk devices included in the ATA disk group 410 via an ATA bus.

Various programs to be executed by the CPU 201 to control the disk array 700 are stored in the memory 202. To be concrete, a RAID control program 210 for controlling the operation of the disk array 700, and a management agent 800 for managing the configuration of the disk array 700 are stored in the memory 202. Various kinds of information is also stored in the memory 202. To be concrete, a drive management table 240 for recording information concerning the FC disk group 310 and the ATA disk group 410, and an LU management table 245 for recording information concerning a logical storage region (hereafter referred to as FCLU) 320 created in the FC disk group 310 and a logical storage region (hereafter referred to as ATA LU) 420 created in the ATA disk group 410 are also stored in the memory 202.

The RAID control program 210 is formed of several subprograms. To be concrete, the RAID control program 210 includes a drive command issuance program 220 to be executed by the CPU 201 when issuing a command to the FC disk group 310 or the ATA disk group 410, a drive management program 230 to be executed to manage the FC disk group 310 and the ATA disk group 410, and an LU management program 225 to be executed to manage logical storage regions (hereafter referred to as LU) preset in respective disk groups.

The management agent 800 is formed of several subprograms. To be concrete, the management agent 800 includes a drive information setting program 250 to be executed when setting information (hereafter referred to as drive information) concerning a disk device in response to an input from the management terminal 500, a drive information notification program 260 to be executed when outputting drive information to the management terminal 500, an array information setting program 270 to be executed when setting information (hereafter referred to as array information) concerning the disk array 700, and an array information notification program 280 to be executed when outputting array information to the management terminal 500.

FIG. 2 is a diagram showing an example of contents of the drive management table 240. The drive management table 240 has items for registering various kinds of information for each of disk devices included in the disk array 700. To be concrete, the drive management table 240 has a "drive No." column 240a for registering a number assigned to the disk device, a "drive type" column 240b for registering a type of the disk device, an "array configuration" column 240c for registering an RAID group (a set of disk devices forming redundancy) including the disk device and its RAID level (hereafter referred to as array configuration), a "use" column 240d for registering a user's use (hereafter referred to as array use) of a RAID group including the disk device, a "start situation" column 240e for registering a situation as to whether the disk device is started or stopped, an "accumulated time" column 240f for registering accumulated operation time of the disk device, a "lifetime setting" column 240g for registering lifetime of the disk device, a "remaining lifetime" column 240h for registering a remaining lifetime of the disk device, and an "automatic migration specification" column 240i for registering whether data should be automatically migrated (hereafter referred to as automatic migration) to another disk device when the disk device is judged to have arrived at the lifetime.

To be concrete, information indicating FC or ATA is registered in the "drive kind" column 240b. A number indicating an order in which the RAID group has been created, and information indicating the RAID level are registered in the "array configuration" column 240c. For example, a disk device for which "(1) RAID5" has been registered is a disk device included in a RAID group having a RAID level 5 created first. In the disk array 700, a plurality of RAID groups can be created. For example, RAID groups RAID1 and RAID5 can be created. Disk devices included in the RAID group may be all devices included in the disk array 700 or may be a part of them.

In the "use" column 240d, to be concrete, information, such as DB indicating the use of the database and FS indicating the use of the file system, is registered. In the "start situation" column 240e, information indicating ON is registered in the case where the disk device is started, and information indicating OFF is registered in the case where the disk device is stopped. In the "remaining lifetime" column 240h, a value indicating a difference between time registered in the "lifetime setting" column 240g and time registered in the "accumulated time" column 240f is stored. In the "automatic migration specification" column 240i, 1 is registered when setting automatic migration of data stored in the disk device, and 0 is registered when not setting automatic migration of data stored in the disk device.

The drive management program 230 is executed in the CPU 201, when the disk array control unit 200 discriminates the kind of the disk device, when the disk array control unit 200 measures the operation time of the disk device, when the disk array control unit 200 controls the start and stop of the disk device, and when the disk array control unit 200 executes the automatic migration in response to arrival of the disk device at the lifetime.

The drive information setting program 250 is executed in the CPU 201, when the disk array control unit 200 sets the kind of the disk device in the drive management table 240 in accordance with an input from the management terminal 500, when the disk array control unit 200 sets the lifetime of the disk device in the drive management table 240, and when the disk array control unit 200 sets the situation of start and stop of the disk device in the drive management table 240.

The drive information notification program 260 is executed in the CPU 201, when the disk array control unit 200 notifies the management terminal 500 of the kind of the disk device, when the disk array control unit 200 notifies the management terminal 500 of the accumulated operation time of the disk device, when the disk array control unit 200 notifies the management terminal 500 of the situation of start and stop of the disk device, when the disk array control unit 200 orders exchange of the disk device, and when the disk array control unit 200 notifies that automatic migration of data to another disk device has been conducted because of arrival of the disk device at the lifetime.

The array information setting program 270 is executed in the CPU 201, when the disk array control unit 200 sets the array configuration in accordance with an input from the management terminal 500, and when the disk array control unit 200 sets the use of the array in accordance with an input from the management terminal 500.

The array information notification program 280 is executed in the CPU 201, when the disk array control unit 200 notifies the management terminal 500 of information concerning the array configuration, and when the disk array control unit 200 notifies the management terminal 500 of information concerning the use of the array.

Figure 3:
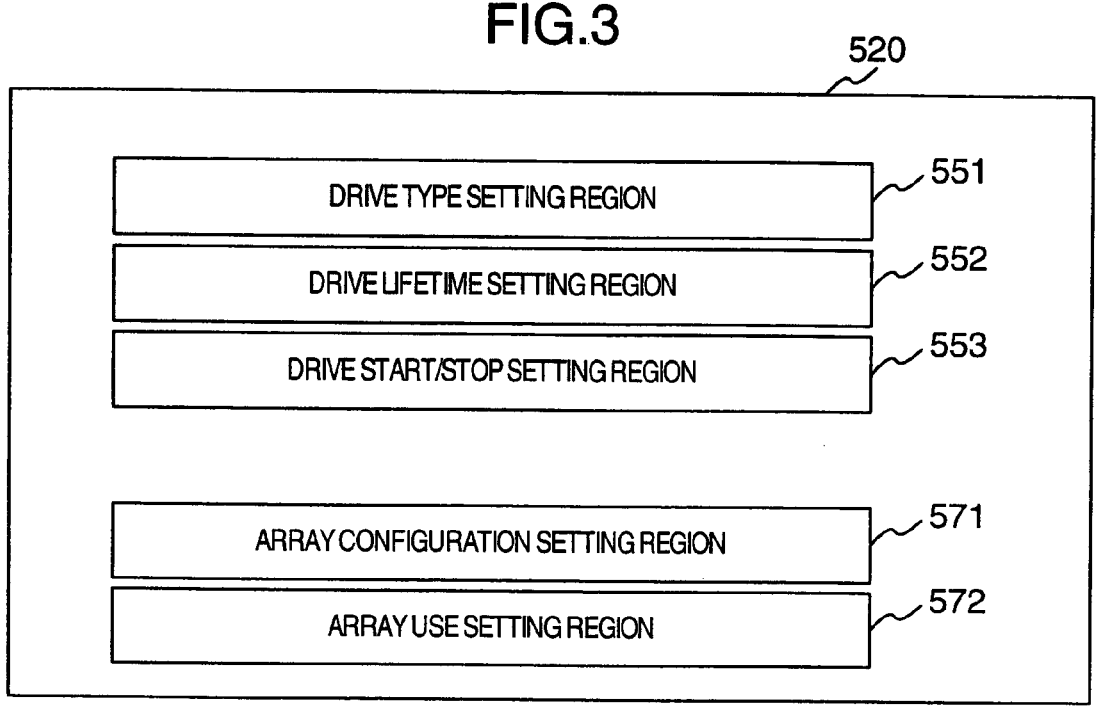
FIG. 3 is a configuration diagram of an input unit in the first embodiment.

FIG. 3 is a diagram showing an example of a picture displayed on the output unit 520 of the management terminal 500 when the user or manager of the disk array 700 conducts setting of the disk array 700. In this case, the following regions are displayed on the output unit 520. The regions are a drive kind setting region 551 for displaying an input kind of the disk device, a drive lifetime setting region 552 for displaying an input lifetime of the disk device, a drive start/stop setting region 553 for displaying a start/stop condition of the disk device specified by the user, an array configuration setting region 571 for displaying an input array configuration, and an array use setting region 572 for displaying an input array use. While watching the picture, the user inputs necessary data via the input unit, and ascertains contents of the input data.

Figure 4:
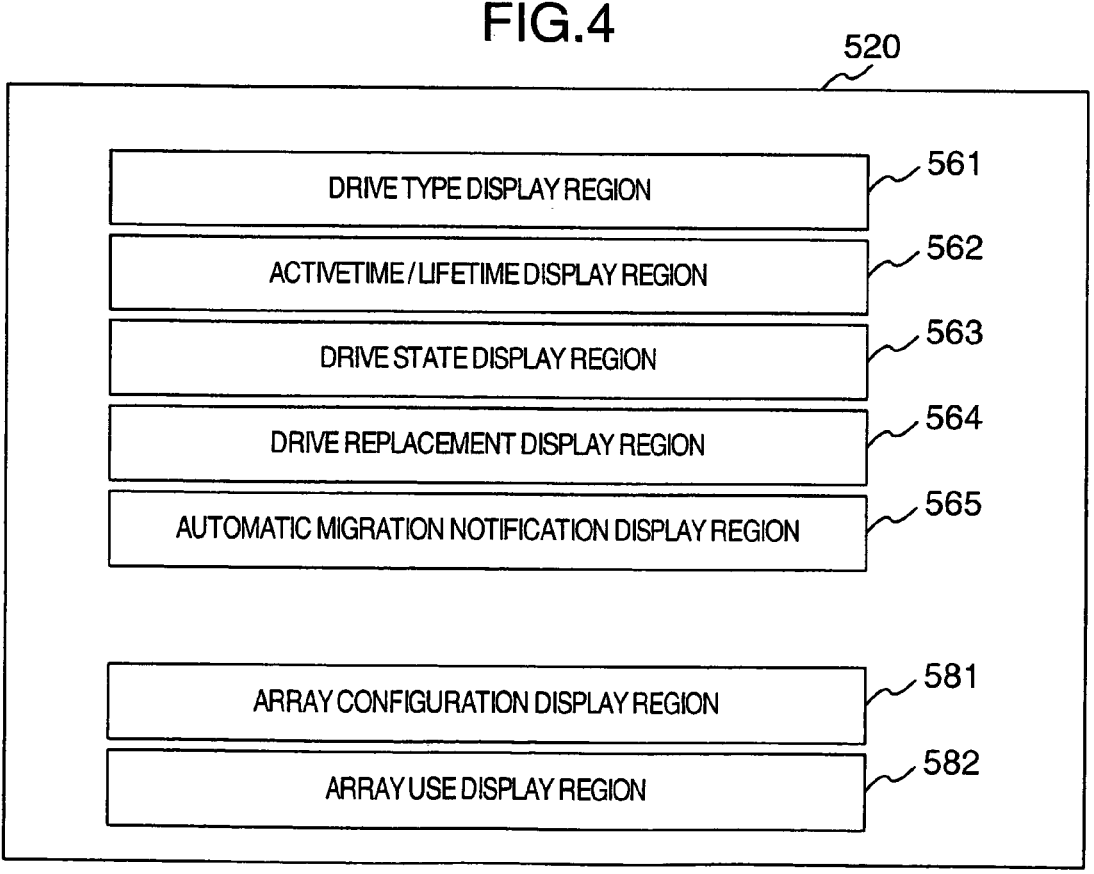
FIG. 4 is a configuration diagram of an output unit in the first embodiment.

FIG. 4 shows an example of a picture displayed on the output unit 520 when the user or manager of the disk array 700 acquires information of the disk array 700 via the management terminal 500. In this case, the following regions are displayed on the output unit 520.

The regions are a drive kind display region 561 for displaying a kind of a disk device included in the disk array 700, an operation time display region 562 for displaying accumulated operation time of a disk device included in the disk array 700, a drive state display region 563 for displaying a start/stop situation of the disk device, an exchange order display region 564 for displaying an exchange order of the disk device, an automatic migration notification display region 565 for displaying that automatic migration of data to another disk device has been conducted because of arrival of some disk device at the lifetime, an array configuration display region 581 for displaying a preset array configuration, and an array use display region 582 for displaying a preset array use. By displaying this picture on the management terminal 500, the manager or user can ascertain the state of the disk array 700.

FIG. 5 is a diagram showing an example of contents of the LU management table 245 used by the disk array control unit 200 to manage the FC LU 320 and the ATA LU 420. In the LU management table 245, the following items for registering information is provided for each LU in order that the disk array control unit 200 may manage respective LUs.

In "LU No." column 245a, identifiers arbitrarily assigned to respective LUs are registered. In "host assignment situation" column 245b, information of "presence" or "absence" indicating whether an LU has been assigned to the host 100 is registered (hereafter referred to as used if assigned, and referred to as unused if not assigned). In "SCSI ID" column 245c, a SCSI ID number, which is assigned to a logical storage including an LU, is registered if the LU is assigned to the host 100. In "LUN" column 245d, a SCSI logical unit number required for the host 100 to access an LU is registered if the LU is assigned to the host 100.

In "capacity" column 245e, a storage capacity assigned to an LU is registered. In "LU kind" column 245f, information indicating the kind as to whether the LU is the FCLU 320 or the ATA LU 420 is registered. In "LU remaining lifetime" column 245g, remaining lifetime of the LU is registered. To be concrete, the disk array control unit 200 acquires remaining lifetime values of respective disk devices forming the LU registered in a "drive No. list" column 245h, from the drive management table 240, and registers a minimum value among them.

In the "drive No. list" column 245h, information that indicates disk devices forming the LU is registered as a list of drive Nos. In "evaluation value" column 245i, information indicating an evaluation value, which serves as a criterion of LU selection, is registered. A method for calculating the evaluation value will be described later. In the case of a used LU, a maximum value (+99999 in the example of FIG. 5) which can be registered is registered in "evaluation value" column 245i.

Hereafter, the case where the disk array control unit 200 conducts construction of the drive management table 240, the LU management table 245, and the RAID group in accordance with an order from the user or manager will be described.

When a power supply of the disk array 700 is turned on, the disk array control unit 200 executes the drive management program 230, and makes inquiries about disk devices connected to the drive FC I/F 205 and the drive ATA I/F 206. As an example of inquiries about the disk devices, there is an example in which a ModeSelect command is used. To be concrete, the disk array control unit 200 issues the ModeSelect command to respective disk devices. Upon receiving the ModeSelect command, the disk device transmits page information stored in the disk device to the disk array control unit 200. Page information contains information concerning the kind of the disk device. The disk array control unit 200 discriminates the kind of the inquired disk device on the basis of page information acquired from the disk device.

Furthermore, the disk array control unit 200 executes the drive information setting program 250, and registers pertinent information in the "drive No." and the "drive kind" items of the drive management table 240 with respect to all of the detected disk devices.

The kind of the disk device may be input by the user via the input unit of the management terminal 500. In this case, the disk array control unit 200 registers information in the drive management table 240 on the basis of information received from the management terminal 500.

After detection or registration of the kind of the disk device has been conducted, the disk array control unit 200 sets the array configuration and array use on the basis of an order from the user.

First, upon receiving an acquisition order of information of "drive No." and "drive kind" input by the user via the input unit 510 in the management terminal 500, the disk array control unit 200 executes the drive information notification program 260, acquires requested information from the drive management table 240, and transfers the requested information to the management terminal 500 via the management I/F 207. The management terminal 500 displays received information in a portion for displaying the "drive No." and "drive kind" in the drive kind display region 561, which is displayed on the output unit 520. In the case where the user defines the kind of the disk device, the present processing may be omitted.

Thereafter, the user selects an arbitrary disk device on the basis of information displayed in the drive kind display region 561, which is displayed on the output unit 520 of the management terminal 500, and inputs an order for constructing a RAID group by using the selected disk device, from the input unit 510 by using the array configuration setting region 571. Furthermore, the user inputs the use of the RAID group to be constructed. The disk array control unit 200 executes the array information setting program, and registers array information, such as the RAID group and use, received via the management I/F 207 in the "array configuration" and "use" columns of the drive management table 240.

The user constructs a RAID group on the basis of the kind of the disk device displayed in the drive kind display picture 561. At this time, however, it is possible to prevent an ATA disk device, which is low in reliability and performance, from being set for array use, which is required to be high in reliability and performance, such as array use for a database. To be concrete, in the case where "use" is specified by the user, a decision is made as to whether the lifetime of the disk device meets the use, on the basis of information concerning the lifetime of the disk device described later. And warning is given to the user in accordance with a result of the decision.

For example, in the case where it is attempted to set an ATA disk device for array use, which is high in reliability and performance, the management terminal 500 may issue caution or warning to the user via the output unit 520. Furthermore, when displaying disk devices in the drive kind display picture 561, disk devices differing in kind may have different patterns so as to be able to be discriminated from each other.

It is also possible to consider a method of disregarding the lifetime of the disk device when first creating a RAID group and adding the remaining lifetime of the disk device as a decision criterion for new use setting when remaking a RAID group again.

Upon receiving information for ordering information acquisition of "array configuration" and "use" input by the user via the input unit 510 of the management terminal 500, the disk array control unit 200 retrieves information requested from the management terminal 500 via the management I/F 207, from the drive management table 240 and transfers the retrieved information, by executing the array information notification program. Upon receiving the information, the management terminal 500 displays the acquired information in the array configuration display region 581 and the array use display region 582 of the output unit 520.

Lifetime management of the disk device conducted by the disk array control unit 200 will now be described. As described earlier, the disk array control unit 200 controls the management of the accumulated operation time and planned start/stop of disk devices, and automatic migration of data.

The "lifetime" of a disk device refers to time preset by a manufacturer of the disk device on the basis of specifications, such as the mean time between failures and recommended service time, of the disk device, or time preset by the disk array manager on the basis of time preset by a manufacturer of the disk device. The "lifetime" of a disk device is defined as "time serving as a criterion of preventive maintenance for preventing a failure caused by a long time operation of the disk device." For a disk device that has exceeded the "lifetime," therefore, it is necessary to execute migration of stored data and the maintenance personnel must execute exchange to a new disk device.

For conducting the lifetime management, first, the disk array 700 conducts lifetime setting and automatic migration specification for each disk device. The present processing may be conducted together when the disk array control unit 200 conducts setting of various tables according to a user's order, or the present processing may be conducted before the disk array control unit 200 conducts setting of various tables according to a user's order. The lifetime setting and automatic migration specification for each disk device are conducted as described below.

Upon receiving the order for acquiring information of "drive No." and "drive kind" input from the input unit 510 of the management terminal 500 by the user, the disk array control unit 200 transfers the requested information to the management terminal 500 via the management I/F 207. Upon receiving the information, the management terminal 500 displays the received information concerning "drive No." and "drive kind" in the drive kind display region 561 of the output unit 520.

The user discriminates the kind of the disk device on the basis of the information displayed in the drive kind display region 561, and conducts setting as to the lifetime of the disk device and as to whether automatic migration is necessary via the input unit 510 of the management terminal 500. Upon receiving information concerning the lifetime of the disk device and whether automatic migration in the disk device is necessary via the management I/F 207, the disk array control unit 200 executes the drive information setting program 252, and registers the received information in "lifetime setting" and "automatic migration specification" columns of the drive management table 240. The information of "lifetime setting" and "automatic migration specification" may not be specified by the user, but the disk array control unit 200 may determine the information of "lifetime setting" and "automatic migration specification" uniquely on the basis of the kind of the disk device and set the information in the drive management table 240. For example, in the case of an FC disk device, it is considerable to predict from the beginning that the lifetime is long and set the information in the drive management table 240.

Figure 6:
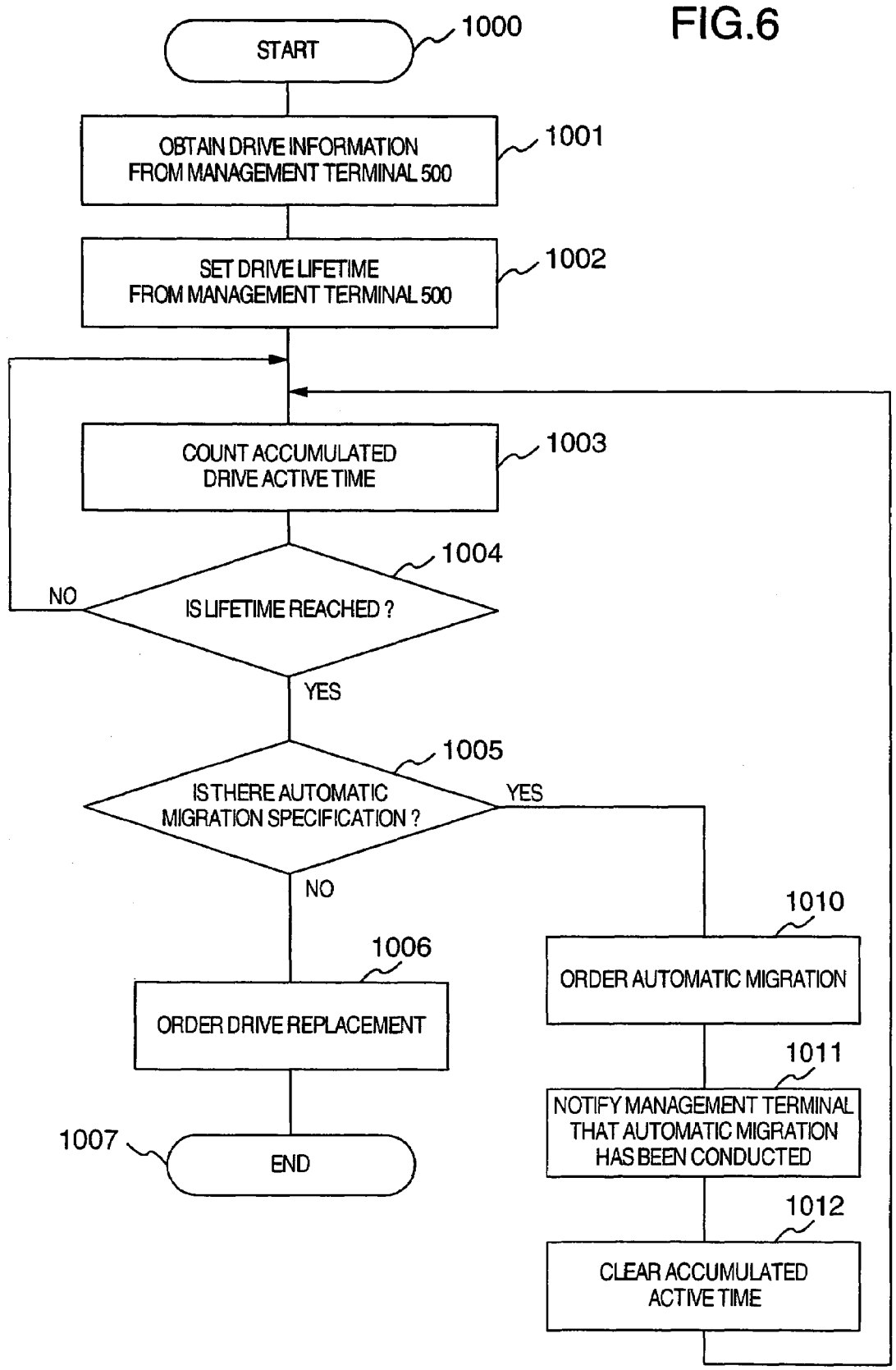
FIG. 6 is a flow chart of a drive lifetime management operation in the first embodiment.

FIG. 6 is a flow chart showing a procedure of the drive lifetime management conducted by the disk array control unit 200.

First, the disk array control unit 200 starts measurement of the operation time of respective disk devices included in the disk array 700 and accumulates results of the measurement in the "accumulated time" of the drive management table 240, by executing the drive management program 230. When measuring the operation time, the disk array control unit 200 measures the operation time on the basis of a clock included in the disk array 700 (step 1003). Thereafter, the disk array control unit 200 compares values in the "accumulated time" and "lifetime setting" in the drive management table 240, and determines whether the accumulated time has reached the preset lifetime. Timing for the comparison may be arbitrary timing that is asynchronous with other processing (step 1004).

If the accumulated time has not reached the lifetime, then the processing returns to the step 1003. If the accumulated time has reached the preset life-time, then the disk array control unit 200 determines whether there is 1 registered in the "automatic migration specification" column 240i for the disk device (step 1005). If the automatic migration is not specified (i.e., the registered value is 0), then the disk array control unit 200 executes the drive information notification program 260, and thereby notifies the management terminal 500 of a disk device that has reached in accumulated time the preset lifetime as a disk device to be exchanged, via the management I/F 207.

The management terminal 500 displays the disk device that has reached in accumulated time the preset lifetime as a disk device to be exchanged, in the exchange order display region 564 of the output unit 520 (step 1006). If the automatic migration is specified for the disk device that has reached in accumulated time the preset lifetime (i.e., the registered value is 1), then the disk array control unit 200 executes the drive management program 230 and the RAID control program 210, and thereby transfers data stored in the disk device that has reached in accumulated time the preset lifetime to a disk device serving as the automatic migration destination. The disk device that serves as the automatic migration destination is specified beforehand by the user or the like. In this case, one disk device may be specified as an automatic migration destination device for a plurality of disk devices (step 1010).

After the data transfer has been completed, the disk array control unit 200 notifies the management terminal 500 of information concerning the disk device designated as the automatic migration destination, via the management I/F 270 (step 1011). Upon being notified of the information, the management terminal 500 displays the information concerning the disk device designated as the automatic migration destination, in the automatic migration notification display region 565 on the output unit 520. The drive management program 230 clears the "accumulated time" in the drive management table 240 concerning the drive subjected to the automatic migration (step 1012), and the processing returns to the step 1003.

In the present embodiment, automatic migration is conducted with respect to a disk device that has reached in accumulated time the lifetime. However, automatic migration may be conducted with respect to a disk device that is less in remaining lifetime than a certain threshold. In this case, the disk array control unit 200 ascertains values registered in the "remaining lifetime" 240h, and discriminates a disk device that is less in remaining lifetime than the threshold.

On the other hand, the disk array control unit 200 controls the start/stop of the operation of the disk devices in order to prevent an increase in the accumulated operation time of the disk devices. This control is conducted independently from the lifetime management shown in FIG. 6.

The disk array control unit 200 conducts start/stop of a disk device on the basis of a preset trigger. The trigger for starting/stopping a disk device may be, for example, time when user's access is completely stopped, such as nighttime. Or the fact that the remaining lifetime of some disk device has become shorter than a certain threshold may be used as a trigger of start/stop of the disk device.

Or the user may directly specify the start/stop of the disk device via the input unit 510 of the management terminal 500. The management terminal 500 transmits an order concerning the start/stop of the disk device to the disk array control unit 200 via the management I/F 207. The disk array control unit 200 controls the start/stop of the disk device on the basis of the received order. Thereafter, the disk array control unit 200 registers the start/stop situation of the disk device in the "start situation" in the drive management table 240. Start/stop of a drive is conducted by issuing a Start/StopUnit command to the drive.

When acquiring the start situation and accumulated operation time of a drive, the user issues an order at the input unit 510 in the management terminal 500 to acquire information of the "start situation" and "accumulated time." The disk array control unit 200 transfers the specified information to the management terminal 500 via the management I/F 207. The management terminal 500 displays the received start situation of the disk device and the accumulated operation time of the disk device in the drive state display region 563 and the operation time display region 562 of the output unit 520.

The user may execute disk device exchange beforehand on the basis of the displayed accumulated operation time or remaining lifetime of the drive.

The case where the disk array control unit 200 issues a command to a disk device having a different interface will now be described.

For example, the ATA disk device 401 cannot conduct processing on a command having a plurality of tags. Upon receiving a command that orders to write data from the host 100, therefore, the disk array control unit 200 executes the drive command issuance program 220 and determines a command to be issued to a disk device. To be concrete, when issuing a command to the disk device, the disk array control unit 200 refers to the "drive kind" in the drive management table 230, and determines whether issuance destination of the command is an FC disk device 301 or an ATA disk device 401. In the case of an ATA disk device 401, the disk array control unit 200 does not issue a command having a plurality of tags, but issues a single command.

According to the present embodiment, it becomes possible to provide disk devices differing in reliability, such as in lifetime, mixedly and manage the disk devices in the same disk array 700. Furthermore, it is possible to determine the use of LUs by considering the reliability of disk devices that form a RAID group. Furthermore, it becomes possible to provide disk devices differing in control scheme mixedly and manage the disk devices in the same disk array.

Figure 7:
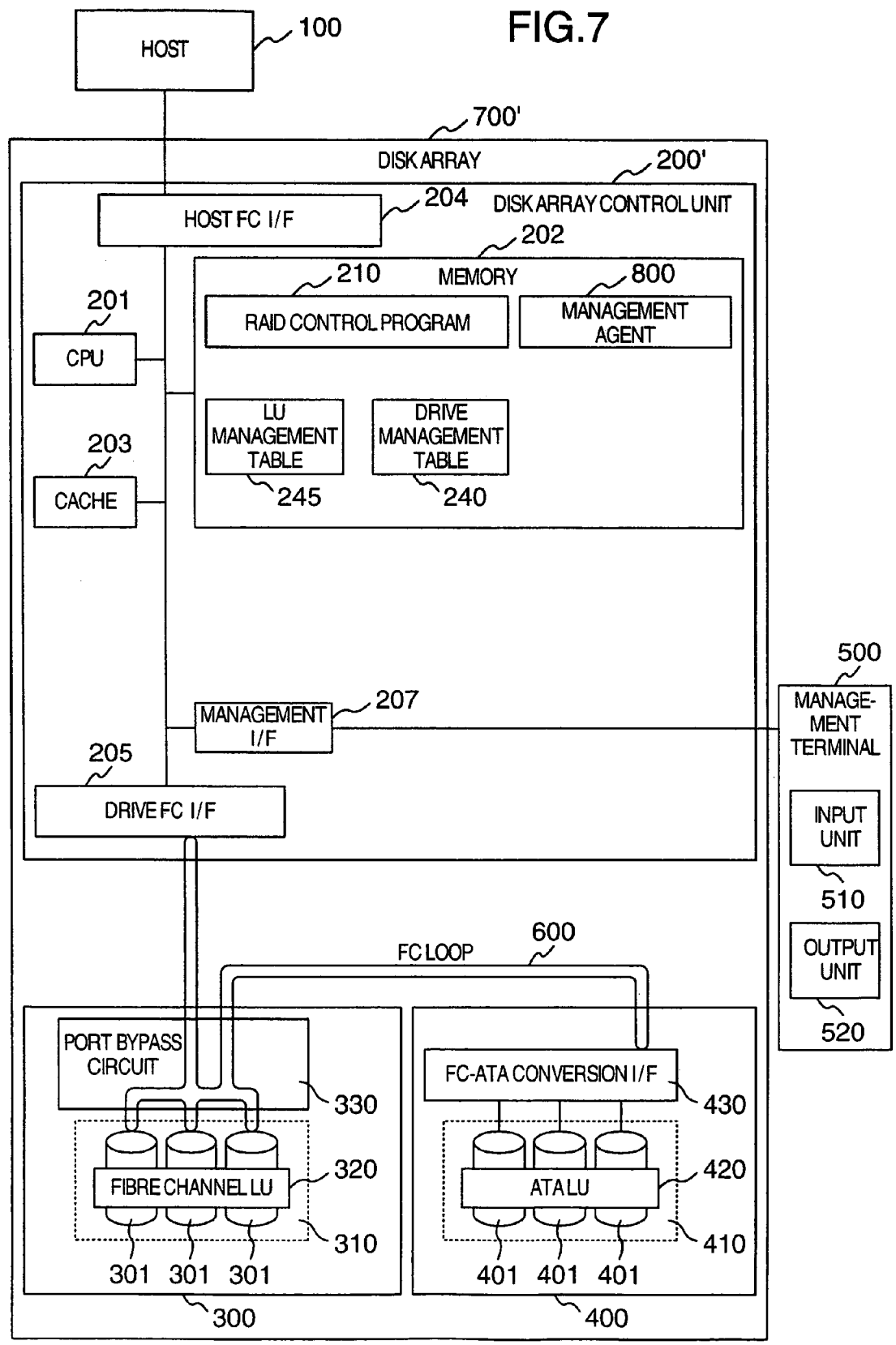
FIG. 7 is a system configuration diagram in a second embodiment of the invention.

FIG. 7 is a diagram showing a second embodiment of a computer system according to the present invention. Hereafter, only differences from the first embodiment will be described. In FIG. 7, a disk array 700' includes an FC drive chassis 300 for storing an FC disk group 310, and an ATA drive chassis 400 for storing an ATA disk drive group 410. FC disk devices 301 stored in the FC drive chassis 300 are connected to a drive FC I/F 205 and the ATA drive chassis 400 via a port bypass circuit 330 included in the FC drive chassis 300. Furthermore, the FC drive chassis 300 and the ATA drive chassis 400 are connected to each other by an FC loop 600, to be concrete, a fibre cable.

ATA disk devices 401 stored in the ATA drive chassis 400 cannot be connected directly to the FC loop 600. Therefore, the ATA drive chassis 400 includes an FC-ATA conversion I/F 430 for converting conversion between the FC interface and the ATA interface. Therefore, the ATA disk devices 401 are connected to the drive chassis 300 via the I/F 430 and the FC loop 600.

Figure 8:
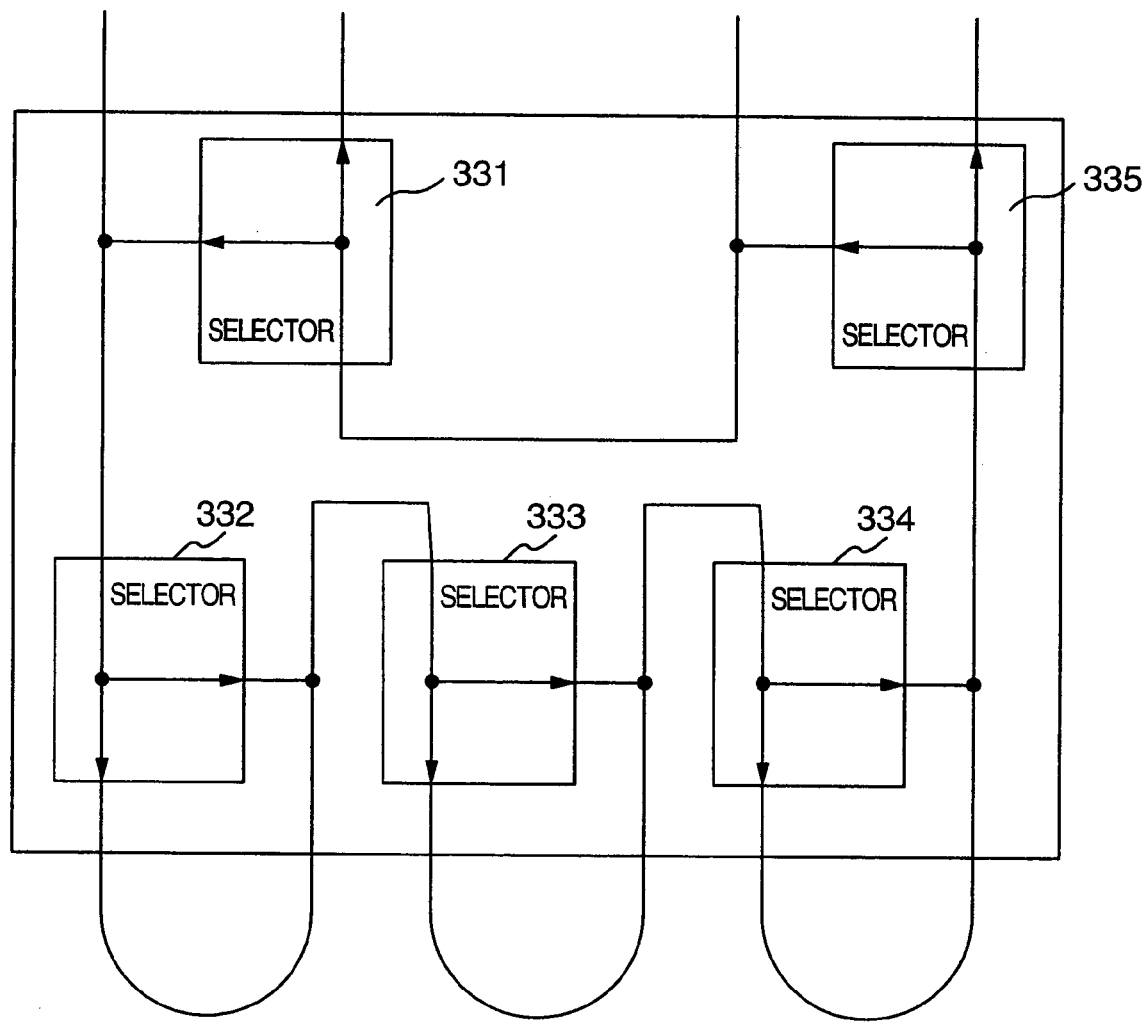
FIG. 8 is a diagram of a port bypass circuit in the second embodiment.

FIG. 8 is a diagram showing a configuration of the port bypass circuit 330. The port bypass circuit 330 shown in FIG. 8 includes five ports. Furthermore, the port bypass circuit includes as many selectors 331 as ports, and thereby executes loop wiring for each port. The selector 331 forms a signal path through a port when wiring is connected to the port, and forms a signal path through an internal circuit, which does not through a port, when the port is not connected.

Figure 9:
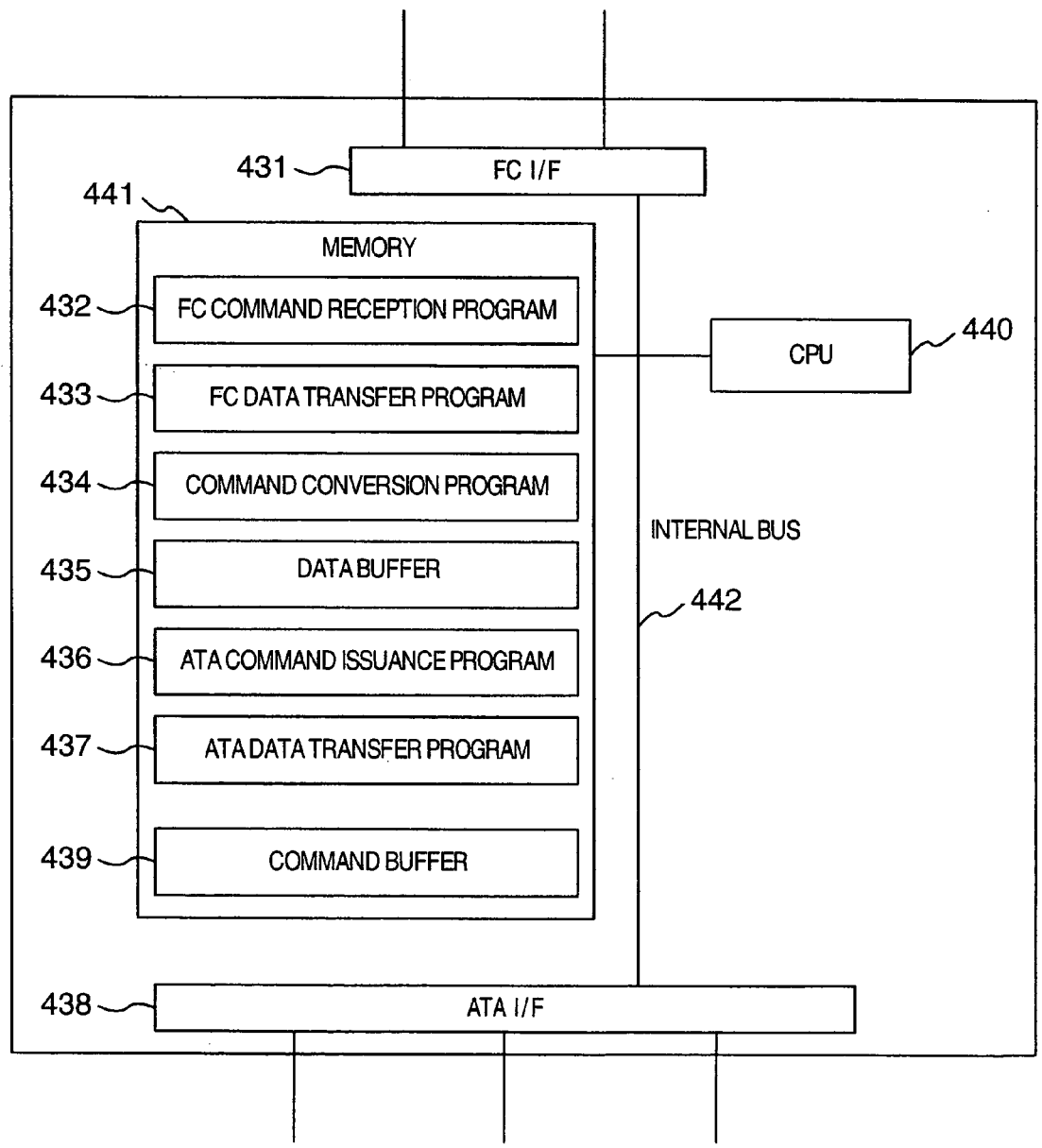
FIG. 9 is a diagram of an FC-ATA conversion I/F in the second embodiment.

FIG. 9 is a diagram showing a configuration of the FC-ATA conversion I/F 430. The FC-ATA conversion I/F 430 functions to connect ATA disk devices to the FC I/F. The FC-ATA conversion I/F 430 includes an FC I/F 431 serving as an interface to the FC, an ATA I/F 438 serving as an interface to the ATA, a memory 441, a CPU 440 for executing programs stored in the memory 441, and an internal bus 442 for connecting the FC I/F 431, the ATA I/F 438, the memory 441 and the CPU 440.

In the memory 441, an FC command reception program 432 to be executed when receiving a command from the FC, an FC data transfer program 433 to be executed when transmitting/receiving data to/from the FC, a command conversion program 434 to be executed when converting an FC command to a command for the ATA, a data buffer 435 for conducting data buffering between the FC and ATA, an ATA command issuance program 436 to be executed when issuing a command obtained by the conversion to the ATA side, an ATA data transfer program 437 to be executed when transmitting/receiving data to/from the ATA, and a command buffer 439 for conducting temporary buffering to hold and regenerate a command.

The CPU 440 executes the FC command reception program 432 to receive a command from the FC, and executes the FC data transfer program 433 to conduct data transfer between the FC I/F 431 and the data buffer 435. Furthermore, the CPU 440 executes the command conversion program 434 to convert an FC command to a command for the ATA, and executes the ATA command issuance program 436 to issue a command obtained by the conversion to the ATA side. Furthermore, the CPU 220 executes the ATA data transfer program 437 to conduct data transfer between the ATA I/F 438 and the data buffer 435.

In the present embodiment, it is possible to connect the disk array control unit 200' to the ATA disk devices 401 via the FC by using the FC-ATA conversion I/F 430. The FC-ATA conversion I/F 430 converts a command received from the disk array control unit 200' to a command for ATA disk device. Furthermore, data transmitted and received between the disk array control unit 200' and an ATA disk device are also converted by the FC-ATA conversion I/F 430.

According to the present embodiment, it is possible to connect an ATA disk device to a fibre channel arbitrated loop, which is an interface for connecting an FC disk device.

Figure 10:
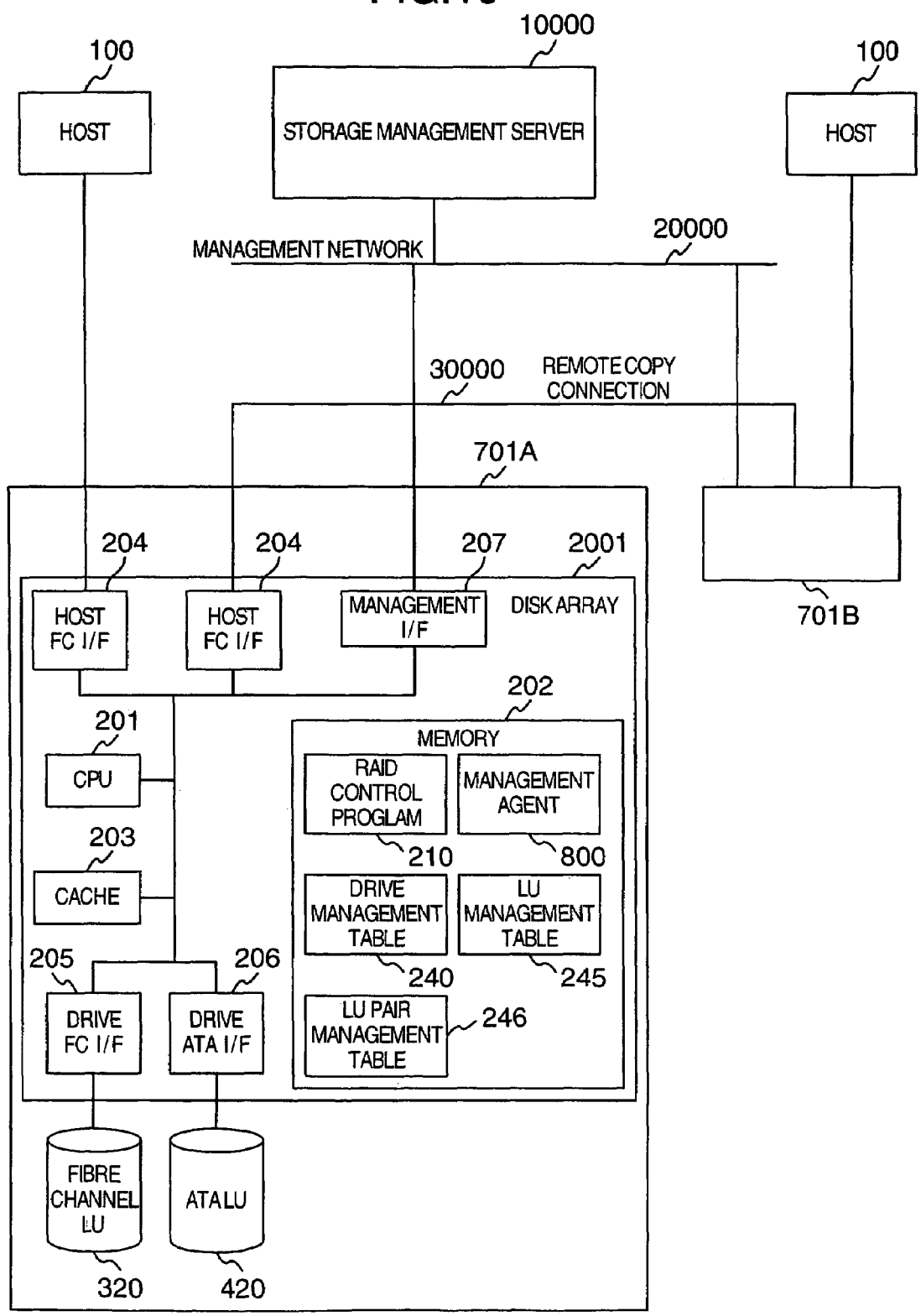
FIG. 10 is a system configuration diagram in the third embodiment of the invention.

FIG. 10 is a diagram showing a third embodiment of a computer system according to the present invention. Hereafter, differences from the first embodiment will be described. In addition to the configuration of the first embodiment, the computer system of the present embodiment includes another disk array 701B connected to a disk array 701A, a host computer 100 connected to the disk array 701B, and a storage management server 10000, which is a computer connected to the disk arrays 701A and 701B via a management network 20000. The two disk arrays are connected to each other via a host FC I/F 204 included in each disk array and a remote copy connection 30000. As for a method for the remote copy connection 30000, for example, a fibre channel, an ESCON, or the like can be considered. In the present embodiment, however, a distinction is not especially made among them. Furthermore, for connection between each disk array 701 and the management network 20000, a management I/F 207 included in each disk array 701 is used.

In addition to the configuration of the first embodiment, the disk array 701 in the present embodiment newly includes an LU pair management table 246 in a memory 202 in a disk array control unit 2001. Furthermore, in a RAID control program, a program module for controlling duplication (hereafter referred to as remote copy) of data between the disk array 701A and the disk array 701B connected thereto, and a program module for managing duplication (hereafter referred to as intra-device replication) of data in the disk array 701A or 701B are newly added. As for methods for implementing the remote copy, there are variations, such as synchronous operation (in which data write request completion is not reported to a host computer until data duplication is completed) and asynchronous operation (in which data write request completion is reported to a host computer without waiting for the data duplication completion). In the present embodiment, however, a distinction is not especially made among them.

FIG. 11 is a diagram showing an example of the LU pair management table 246. By using the LU pair management tables 246 registered in respective memories 202, the disk arrays 701A and 701B manage a pair of LUs (hereafter referred to as LU pair) that hold the same data between disk arrays used for remote copy, or a pair of LUs that hold the same data in the disk array 701 generated by the intra-device replication.

The LU pair management table 246 has items of "LU pair No.", "copy source LU information", "copy destination LU information", and "pair state".

In an "LU pair No." column 246a, an identifier assigned arbitrarily to an LU pair is registered. In the present embodiment, identifiers are assigned without discriminating LU pairs between the disk arrays 701 from LU pairs in the disk array 701.

The "copy source LU information" item has three sub-items described below. In an "LU pair No." column 246b, an LU No. assigned to an LU (hereafter referred to as copy source LU) that stores original data included in an LU pair provided with some identifier is registered. In a "pair attribute" column 246c, information for determining whether the LU pair is an LU pair based on the remote copy or an LU pair based on the intra-device replication, to be concrete, a value indicating "remote" in the case of the remote copy or a value indicating "local" in the case of the intra-device replication is registered. In a "LU kind" column 246d, a kind of a disk device that stores the copy source LU is registered.

The "copy destination LU information" item has three sub-items described below. In a "device ID" column 246e, an identifier assigned to a disk array 701 to which an LU (hereafter referred to as copy destination LU) paired with the copy source LU belongs is registered. For example, in the case of the remote copy, an identifier assigned to a disk array 701 of the remote copy destination is registered. In the case of an intra-device replication, an identifier assigned to a disk array 701 having a copy source LU is registered. In an "LU pair No." column 246f, an LU No. assigned to a copy destination LU is registered. In a "LU kind" column 246g, a kind of a disk device that holds the copy destination LU is registered.

In a "pair state" column 246h, the current state of the LU pair is registered. For example, a value indicating whether the current state is a state (hereafter referred to as pair state) in which synchronization of data stored in respective LUs of the LU pair is attained and contents of data stored in the respective LUs coincide with each other, or a state (hereafter referred to as split state) in which synchronization of data is not attained between the LUs of the LU pair is registered.

The disk array 701 conducts the following operations by using the function of the intra-device replication. For example, the disk array 701 changes an LU pair that assumes the pair state to the split state at arbitrary time. By doing so, data held by the LU pair at arbitrary time is preserved in the copy destination LU (such processing is referred to as snapshotting). Thereafter, the host 100 reads out data from the copy destination LU, and writes the data into another storage, such as a tape device. As a result, it is possible to obtain a backup of data stored in the LU pair at time of snapshot acquisition. Furthermore, the copy destination LU itself after the snapshot has been acquired may be preserved as the backup of the data.

It is also possible to combine an LU pair of the remote copy with an LU pair of the intra-device replication. For example, in the case where remote copy is conducted between the disk arrays 701A and 701B, the copy destination LU held by the disk array 701B is used as the copy source LU of the intra-device application to be executed by the disk array 701B. And within the disk array 701B, the copy destination LU that serves as an LU pair for the intra-device application may be created. The copy destination LU thus created can be used for data backup by attaining the split state as described above.

The user can freely combine the FCLU 320 and the ATA-LU 420, and set the copy source LU and the copy destination LU (hereafter referred to as LU pair). Especially, the user can set the assignment of the LU pair with due regard to features of respective-LUs via the storage management server 10000 described later. For example, it is possible to set the LU kind to the feature, and assign the fibre channel LU 320 using a FC disk device of high performance and high reliability to the copy source LU and assign the ATA-LU 420 using an ATA disk device of low price to the copy destination LU. Furthermore, it is possible to set the LU remaining time to the feature, and conduct setting so as not to select an LU having a disk device that is short in remaining lifetime as a subject of assignment, or use the LU having a disk device that is short in remaining lifetime, only for the copy destination of the intra-device replication.

Figures 12, 13:
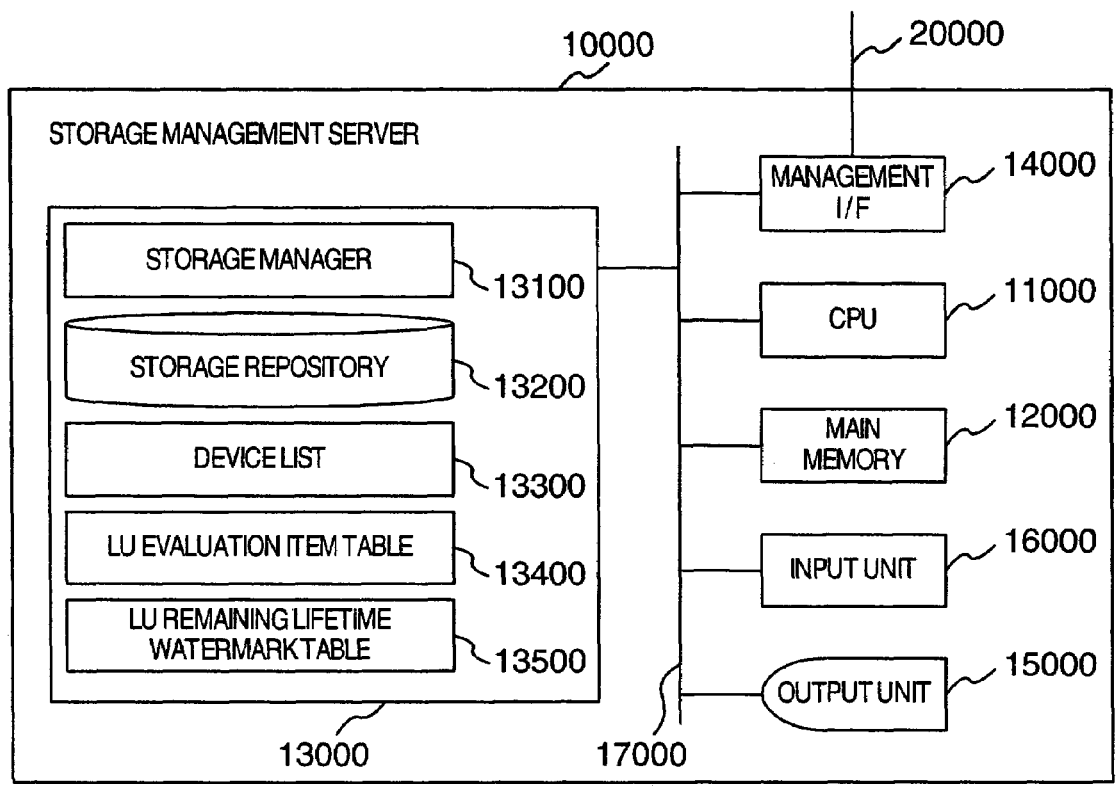
FIG. 12 is a diagram of a storage management server in the third embodiment.
FIG. 13 is a diagram showing an example of a device list in the third embodiment.

The storage management server 10000 will now be described. FIG. 12 is a diagram showing a configuration of the storage management server 10000.

The storage management server 10000 includes a CPU 11000, a main memory 12000, a storage unit 13000, a management I/F 14000 for connection to a management network 20000, an output unit 15000, and an input unit 16000. These components are connected to each other via a communication line, such as a bus. In the storage unit 13000, a storage manager 13100 serving as a program executed by the CPU 11000, a storage repository 13200 serving as a region for storing information collected from the disk array 701, a device list 13300 for holding a list of the disk array 700 to be managed by the storage manager 13100, an LU evaluation item table 13400, and an LU remaining lifetime watermark table 13500 for managing the remaining lifetime of the LU.

In the storage repository 13200, information stored in the drive management table 240, the LU management table 245, and the LU pair management table 246, which are included in the disk arrays 701A and 701B, is periodically collected, and duplications of these tables are created. Furthermore, the device list 13300, the LU evaluation item table 13400, and the LU remaining lifetime watermark table 13500 are created by execution of the storage manager 13100 conducted by the storage management server 10000 on the basis of a user's order.

FIG. 13 is a diagram showing an example of the device list 13300. The device list 13300 is used by the storage management server 10000 to ascertain the disk array 701 to be managed by the storage management server 10000 itself and refer to information required to communicate with the disk array 701. In a "subject device No." column 13300*a*, an identifier assigned arbitrarily to the disk array 701, which is managed by the storage management server 10000, is registered. In a "device ID" column 13300*b*, a peculiar identifier assigned to the disk array 701 is registered. In an "IP address" column 13300*c*, information required for the storage management server 10000 to communicate with the disk array 701, such as information concerning an IP address assigned to the disk array 700 in the case where an IP network is used as the management network 20000, is registered.

FIG. 14 is a diagram showing an example of the LU evaluation item table 13400. In the LU evaluation item table 13400, items to be considered when selecting LUs of the LU pair and evaluation contents in the items are registered beforehand. When retrieving an LU that meets a user's order, the storage management server 1000 evaluates respective LUs with respect to items registered in the LU evaluation item table 13400, and registers evaluation contents specified by the table in the item of the evaluation value 245*i* in the duplication (hereafter referred to as LU management table 245') of the LU management table 245. Thereafter, the storage management server 10000 selects a suitable LU, and exhibits the selected LU to the user.

In an "evaluation item" column 13400*a*, evaluation items at the time of LU specification which can be selected by the user are registered. In an "evaluation subject LU management table column" column 13400*b*, an item in the LU management table 245, such as the LU kind 245*f*, which becomes the evaluation subject in the evaluation item, is registered. In an "input condition reading with expression changed" column 13400*c*, it is registered whether reading a condition input by the user, while changing its expression is needed when evaluating LUs registered in the LU management table 245'. In a "penalty at the time of condition satisfaction" column 13400*d*, a value to be added to the value of the "evaluation value" column 245*i* in the LU management table 245' when the condition input by the user agrees with a content registered in an item of the LU management table 245' to be evaluated is stored. In a "penalty at the time of condition unsatisfaction" column 13400*e*, a value to be added to the value of the "evaluation value" column 245*i* in the LU management table 245' when the condition input by the user does not agree with a content registered in the column of the LU management table 245' to be evaluated is registered. A concrete LU evaluation method will be described later.

Figures 18, 19:
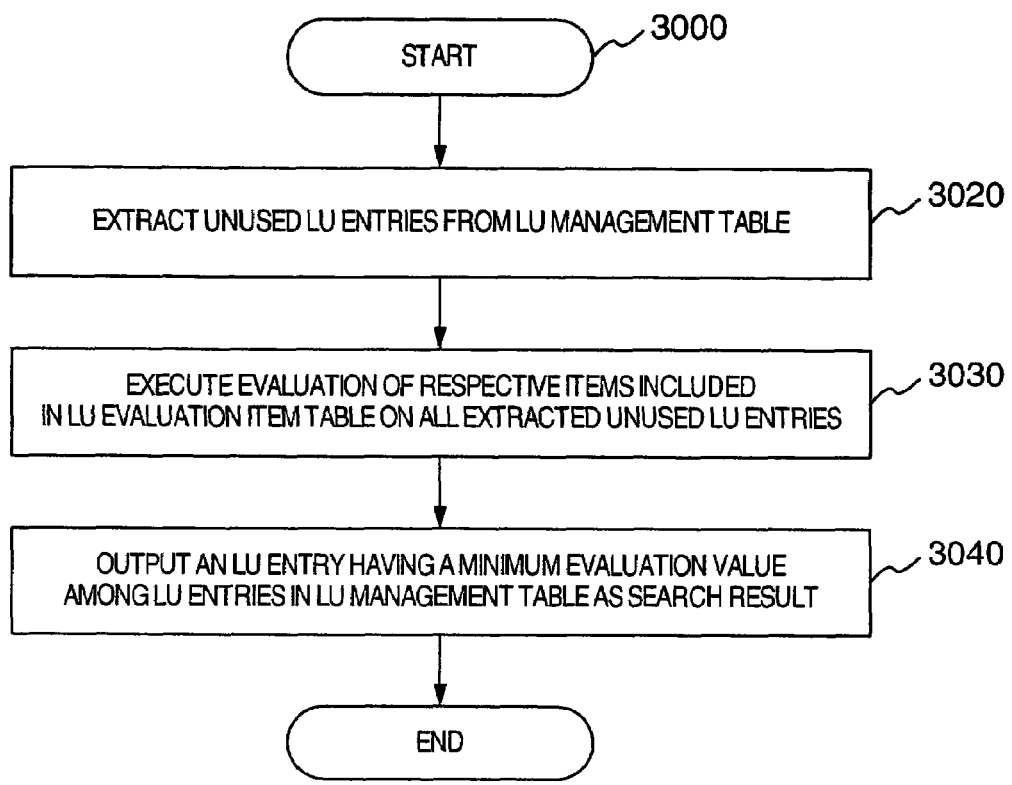
FIG. 18 is a flow chart of assignment candidate LU search processing in the third embodiment.
FIG. 19 is a diagram showing an example of an LU remaining lifetime watermark table in the third embodiment.

FIG. 19 is a diagram showing an example of the LU remaining lifetime watermark table 13500. The LU remaining lifetime watermark table 13500 is used when the storage management server 10000 manages the remaining lifetimes of LUs included in respective disk arrays 701. To be concrete, the LU remaining lifetime watermark table 13500 has the following items for registering information.

In a "watermark No." column 13500*a*, an identifier assigned arbitrarily to each of a plurality of preset watermarks is registered. In a "device ID" column 13500*b*, an identifier assigned to a disk array 701 to be managed in remaining lifetime is registered. In a "monitoring subject LU list" column 13500*c*, information indicating an LU that is included in LUs of the disk array 701 to be managed and that is actually managed in remaining lifetime is registered. In a "remaining lifetime watermark" column 13500*d*, information that indicates a watermark corresponding to the identifier is registered.

In the present embodiment, the storage management server 10000 ascertains the remaining lifetime of the LU registered as the management subject, and if the ascertained remaining lifetime becomes shorter than a preset watermark, the storage management server 10000 outputs a warning to the user. According to circumstances, the storage management server 10000 urges the user to set the LU migration or issues an automatic migration order to the disk array device. In the case where the importance of data stored in the LU is low, the lifetime of disk devices included in the LU may be used as a decision criterion instead of using the lifetime as the decision criterion. In this case, however, fast exchange of disk devices becomes necessary.

In the present embodiment, the user can consider parameters concerning performance and reliability of disk devices, when creating LUs of the disk array 701 including a mixture of disk devices having different input/output I/Fs by using the storage management server 10000. Hereafter, this processing is referred to as LU assignment processing. Unless otherwise stated, processing described hereafter with reference to a flow chart is processing conducted by execution of the storage manager 13100 effected by the storage management server 10000.

FIG. 15 is a flow chart showing a procedure of LU assignment processing 2000. First, on the basis of an order from the user, the storage management server 10000 determines whether processing to be executed is processing of assigning the copy source LU to the host 100 or processing of assigning the copy destination LU in the remote copy or the intra-device replication (step 2100).

If the processing to be executed is judged to be processing of assigning the copy source LU to the host 100 at the step 2100, then the storage management server 10000 conducts processing of assigning an LU to the host. Details of the present processing will be described later (step 2200). Thereafter, the storage management server 10000 inquires of the user whether a copy destination LU should be assigned. To be concrete, display for inquiring whether processing should be conducted is output to the output unit 15000 (step 2300).

If the copy destination LU assignment is ordered by the user at the step 2100, or if the copy destination LU assignment is ordered by the user at the step 2300, then the storage management server 10000 conducts copy destination LU assignment processing. As for the present processing as well, details will be described later (step 2400). Thereafter, the storage management server 10000 finishes the LU assignment processing. If the copy destination LU assignment processing is judged at the step 2300 to be unnecessary, then the storage management server 10000 finishes the LU assignment processing immediately.

Figure 16:
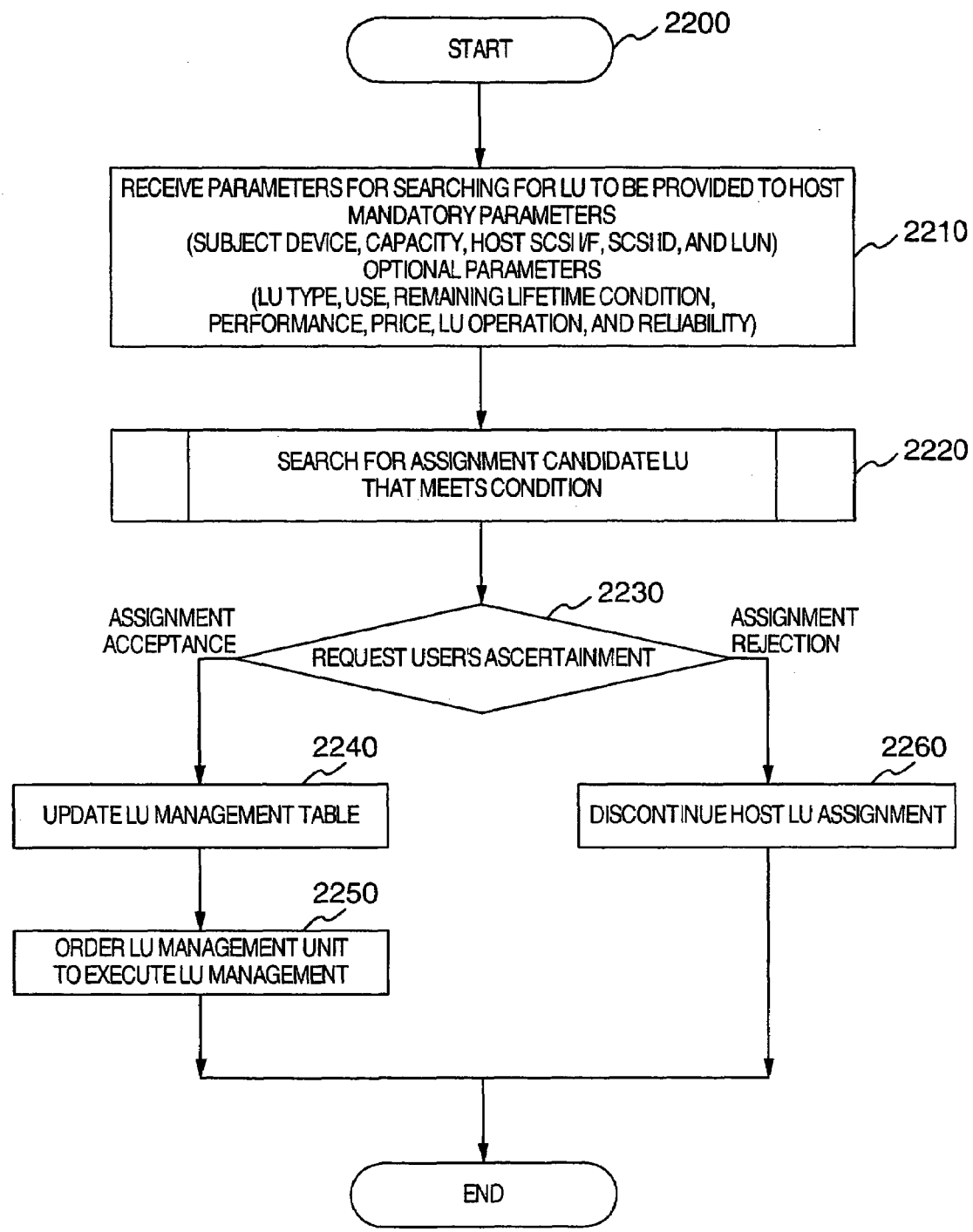
FIG. 16 is a flow chart of host LU assignment processing in the third embodiment.

FIG. 16 is a flow chart showing a detailed procedure of the processing of assigning an LU to the host executed at the step 2200 shown in FIG. 15. The storage management server 10000 receives a condition (hereafter referred to as parameters) required of the copy source LU, from the user. In addition to basic information required for LU creation, such as a subject device in which an LU is created, a storage capacity of the LU, a host FC I/F, a SCSI ID, and a LUN, the parameters include information concerning evaluation items registered in the "item" column of the LU evaluation item table 13400 (step 2210).

Thereafter, the storage management server 10000 conducts assignment candidate LU search processing of selecting a suitable LU as a candidate of the copy source LU on the basis of the parameters given by the user. Details of the present processing will be described later (step 2220).

Thereafter, the storage management server 10000 exhibits the selected LU candidate to the user, and requests user's ascertain-ment (step 2230).

If the user has admitted the exhibited LU candidate as the copy source LU at the step 2230, then the storage management server 10000 updates the LU management table 245 stored in the disk array 701 having the admitted LU, and its duplication 245'. To be concrete, with respect to the LU management table 245' stored in the storage repository 13200, the storage management server 10000 first alters the "host assignment situation" column 245*b* for the admitted LU to "present", and registers values of parameters given by the user in the "SCSI ID" column 245*c* and the "LUN" column 245*d*. Thereafter, the storage management server 10000 orders the disk array 701 having the admitted LU to reflect update contents of the LU management table 245' in the LU management table 245 (step 2240).

Thereafter, the storage management server 10000 orders the disk array control unit 200 to execute the LU management on the basis of the LU management table 245 in which update has been reflected, and finishes the processing of assigning an LU to the host (step 2250).

If the exhibited LU is rejected by the user at the step 2230, then the storage management server 10000 discontinues the processing of assigning an LU to the host (step 2260). In order to achieve automatization of the processing, processing of setting the selected LU as the copy source LU may be conducted without exhibiting the selected LU to the user.

Figure 17:
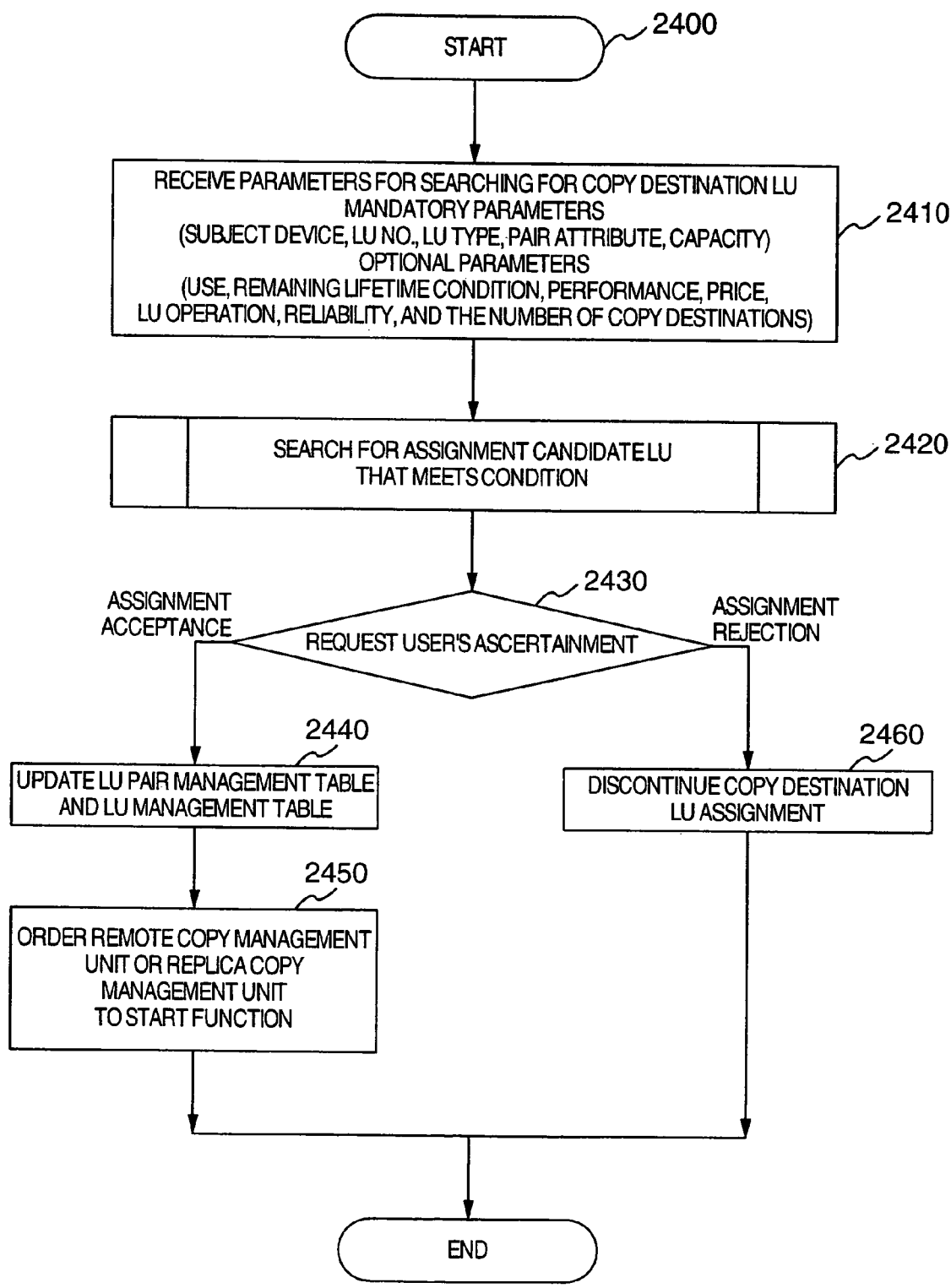
FIG. 17 is a flow chart of copy destination LU assignment processing in the third embodiment.

FIG. 17 is a flow chart showing a detailed procedure of the copy destination LU assignment processing indicated by the step 2400 in FIG. 15.

The storage management server 10000 receives parameters for selecting the copy destination LU from the user. The parameters are the information described above with reference to the copy source LU (step 2410).

Thereafter, the storage management server 10000 conducts assignment candidate LU search processing for selecting a candidate that can become the copy destination LU on the basis of the parameters given by the user. Details of the present processing will be described later (step 2420). Thereafter, the storage management server 10000 exhibits the candidate of the copy destination LU selected at the step 2420 to the user, and requests ascertainment of use of the selected LU (step 2430).

If the user admits the exhibited LU as the copy destination LU at the step 2430, then the storage management server 10000 updates the LU pair management table 246, the LU pair management table 245, and their duplications 246' and 245'. Furthermore, the storage management server 10000 orders the disk array 701 that stores the selected LU to reflect the updated contents in respective tables. To be concrete, with respect to the LU pair management table 246', the storage management server 10000 newly creates an LU pair entry for the selected copy destination LU, and registers parameters specified by the user and information of the selected copy destination LU. With respect to the LU management table 245', the storage management server 10000 alters the "host assignment situation" column 245*b* of the selected LU to "present", and registers parameter values in the "SCSI ID" column 245*c* and the "LUN" column 245*d* (step 2440).

Thereafter, the storage management server 10000 orders the disk array control unit 200 in the disk array 701 having a copy source LU paired with the selected copy destination LU to execute remote copy processing or intra-device replication processing on the basis of the pair LU management table 246 obtained after the update, and finishes the copy destination LU assignment processing (step 2450).

If the storage management server 10000 has rejected the exhibited copy destination LU at the step 2430, then it discontinues the copy destination LU assignment processing, and finishes the copy destination LU assignment processing (step 2460). In order to achieve the automatization of the processing, processing of setting the selected LU as the copy destination LU may be conducted without exhibiting the selected LU to the user.

FIG. 18 is a flow chart showing a detailed procedure of the assignment candidate LU search processing shown in the step 2220 in FIG. 16 and the step 2420 in FIG. 17.

First, the storage management server 10000 extracts an LU that is not being used by the host 100 from the LU management table 245' stored in the storage repository 13200. To be concrete, an LU having "present" registered in the "host assignment situation" column 245*b* in the LU management table 245' is judged to have been already used, and a maximum value (+99999 in FIG. 9) is registered in the evaluation value. An LU having "absent" registered in the "host assignment situation" column 245*b* is judged to have not been used yet, and the evaluation value is reset to 0 (step 3020).

Subsequently, the storage management server 10000 gives an evaluation value to every unused LU extracted at the step 3020, with respect to each of items registered in the LU evaluation item table 1340. A concrete example will be described later (step 3030).

Thereafter, the storage management server 10000 outputs an LU that is minimum in the value of the "evaluation value" column 245*i* and that is included in all LUs registered in the LU management table 245' as a candidate for the copy source LU or the copy destination LU (step 3040).

The evaluation values registered in the LU management table 245' are updated together when the storage management server 10000 orders each disk array 701 to update the LU management table 245 (steps 2240 and 2440).

Hereafter, four concrete examples of the step 3030 will be described.

As a first example, evaluation conducted when the user has specified the "kind" as "FC" will now be described. By ascertaining the "evaluation subject LU management table" column 13400*b*, the storage management server 10000 ascertains that a column in the LU management table 245' to be compared with the user's specification value "FC" is the "LU kind" column. Thereafter, the storage management server 10000 selects one of extracted unused LUs, and ascertains the content of the "LU kind" column in the LU management table 245' that corresponds to the LU. If information registered in the "LU kind" column is "FC", then the condition specified by the user is met, and the storage management server 10000 adds 0 to the evaluation value column 245*i* in the LU management table 245' with respect to the unused LU, in accordance with a value that is registered in the "penalty at the time of condition satisfaction" column 13400*d* and that corresponds to the "kind" item. If information registered in the "LU kind" column is "ATA", then the condition input by the user is not met, and consequently the storage management server 10000 adds +100 to the evaluation value column 245*i* in the LU management table 245' with respect to the unused LU, in accordance with a value that is registered in the "penalty at the time of condition unsatisfaction" column 13400*e* and that corresponds to the "kind" item.

The storage management server 10000 repeats the processing described above, i.e., processing of making a decision as to whether the condition specified by the user is met from item to item, and adding a predetermined value to the evaluation value column 245$i$ in the LU management table 245' as an evaluation value in accordance with a result of the decision, until evaluation of all items shown in the LU evaluation item table 13400 has been applied to all extracted unused LUs. As a result of the present processing, the values of the evaluation value column 245$i$ in the LU management table 245' for all unused LUs are determined. It is shown in this concrete example that the storage management server 10000 can provide an LU including FC disk devices as a candidate as a result of selection of the kind of the disk device as "FC" conducted by the user.

As a second example, evaluation conducted when the user creates an LU for backup operation will now be described. In the operation form in which the data backup is held over a plurality of generations, it is conceivable to use an LU formed of inexpensive disk devices or an LU formed of disk devices that are hardly usable for ordinary business operation because of their short remaining lifetime, as the LU for backup. For the sake of such a case, an evaluation item "LU operation" as shown in FIG. 14 is defined in the present example. The present evaluation item is an item for evaluating an LU so that the storage management server 10000 may provide an LU that is "ATA" in "LU kind" and "1000 hours or less" in "LU remaining lifetime" preferentially as a candidate when the user has specified "backup" as "LU operation." The evaluation procedure is the same as that in the first example. Owing to this evaluation item, the storage management server 10000 can exhibit an LU candidate more suitable for backup use to the user.

As a third example, evaluation for effecting LU creation according to the reliability requested by the user will now be described. In such a case, it is defined that "LU remaining lifetime" is evaluated in an evaluation item "reliability" as shown in FIG. 14. The present evaluation item is an item for evaluating each LU so that the storage management server 10000 may provide an LU that is "at least 30000 hours" in "LU remaining lifetime" preferentially as a candidate when the user has specified "high" as "reliability." Owing to this evaluation item, the storage management server 10000 can evaluate the remaining lifetime by using a predefined evaluation criterion and provide a suitable LU candidate.

As a fourth example, evaluation for conducting LU creation according to the number of copy destinations preset by the user will now be described. In some cases, a large number of copy destinations are created by utilizing the function of the remote copy or the intra-device replication in order to hold data over a plurality of generations as described with reference to the second example. In such a case, it is defined that "LU kind" is evaluated in an evaluation item "the number of copy destinations" as shown in FIG. 14. The present evaluation item is an item for evaluating each LU so that the storage management server 10000 may preferentially search an inexpensive ATA LU and exhibit it to the user as a candidate when the user has specified a large number of copy destinations. Owing to the present evaluation item, the storage management server 10000 can evaluate the LU kind by using a predefined evaluation criterion, on the basis of the number of copy destinations specified by the user, and provide a suitable copy destination LU candidate.

In the present embodiment, the storage management server 10000 implements lifetime management in the LU level in a disk array 701 that includes a mixture of disk devices differing in input and output I/Fs. Hereafter, this processing will be referred to as LU lifetime management processing. Unless otherwise stated, each processing is effected by execution of the storage manager 13100 conducted by the CPU 11000 in the storage management server 10000.

FIG. 20 is a flow chart showing a procedure of LU remaining lifetime management processing.

The storage management server 10000 periodically monitors the LU remaining lifetime by using information in the LU management tables 245' respectively of the disk arrays 701A and 701B, which is periodically updated by the storage repository 13200. To be concrete, with respect to each LU specified in the "device ID" column 13500$b$ and "monitoring subject LU list" column 13500$c$ in the LU remaining life watermark table 13500, the storage management server 10000 compares a value registered in the "LU remaining lifetime" column 245$g$ in the LU management table 245' corresponding to each LU with a watermark preset in each LU (a value registered in "remaining lifetime watermark" column 13500$d$ corresponding to each LU). If a plurality of watermarks can be applied to one LU according to the situation preset in the "monitoring subject LU list" column 13500$c$, then such a watermark as to maximize the value in the "remaining lifetime watermark" column 13500$d$ is applied (step 4010).

If as a result of the comparison the remaining lifetime of each LU is less than the value registered in the "remaining lifetime watermark" column 13500$d$, then the storage management server 10000 judges that LU to be an LU that needs a warning output (step 4020).

If an LU that becomes a subject of warning does not exist at the step 4020, then the storage management server 10000 returns to the processing in the step 4010 and continues the LU remaining lifetime management.

If an LU that becomes a subject of warning exists at the step 4020, then the storage management server 10000 discriminates a disk device that is less in remaining lifetime than the watermark, with respect to the LU that needs the pertinent warning output, and determines whether automatic migration has been specified for that disk device. To be concrete, with respect to all disk devices stated in the "drive No. list" column 245$h$ in the LU management table 245' to which the LU that is less in remaining lifetime than the watermark belongs, the storage management server 10000 examines the "remaining lifetime" column 240$h$ in the drive management table 240', discriminates disk devices that are less in remaining lifetime than the watermark, and ascertains the "automatic migration specification" column 249 (step 4030).

If automatic migration is specified in all disk devices included in an LU that is less in remaining lifetime than the watermark at the step 4030, then the storage management server 10000 outputs only a warning. If the disk array device does not start the automatic migration operation, then the storage management server 10000 orders the disk array device to conduct automatic migration. As concrete examples of the warning content, "monitoring time", "device ID in disk array", "LU No.", "drive No. that is less in remaining lifetime than watermark", and "device ID and LU No. in the related copy source or copy destination LU" can be mentioned.

When outputting the "device ID and LU No. in the related copy source or copy destination LU", information in the LU pair management table 246 held in the storage repository 13200 is used. By outputting "device ID and LU No. in the related copy source or copy destination LU", the user can immediately recognize the possibility that the LU that has become the warning subject will affect another copy source or copy destination, and in some cases the user can execute manual alteration of LU pair caused by excess of remaining lifetime (step 4040).

If automatic migration is not specified for even one of disk devices included in an LU that is less in remaining lifetime than the watermark at the step 4030, then the storage management server 10000 outputs a warning to the user, and outputs a message for urging the migration specification or the drive exchange order. As concrete examples of the warning content, "drive Nos. which become candidates of migration destination" can be mentioned, besides the contents stated in the step 4040.

In determining "drive Nos. which become candidates of migration destination", the storage management server 10000 determines that unused disk devices that are the same in drive kind and that are not preset in array configuration should be searched by using the information in the drive management table 240' held in the storage repository 13200. By using the output of "drive Nos. which become candidates of migration destination", the user can reduce the burden of searching for an automatic migration destination for conducting migration specification. Since the disk array automatically determines the automatic migration destination of the disk device, the output of the "drive Nos. which become candidates of migration destination" may be omitted (step 4050).

According to the present embodiment, when creating LUs of a disk array including a mixture of disk drives differing in input and output I/Fs and reliability, LUs can be created while considering the performance and reliability of the disk drive, on the basis of characteristics ordered by the user. Furthermore, in the case where the disk array has a function of the remote copy or intra-device replication, the copy destination LU can also be automatically determined while considering the performance and reliability of the disk drive, on the basis of characteristics ordered by the user. In addition, lifetime management of disk devices in a disk array, which is hard for the user to be conscious of, can be conducted in the level of LU, which is a logical volume.

Even if the disk array 700 has the configuration of the second embodiment, the storage management server 10000 in the present embodiment can conduct the LU creation and the lifetime management in the LU level while considering the performance and reliability of a disk device.

The lifetime management conducted by the storage management server 10000 while taking an LU as the unit in the present embodiment may be executed by the control unit 200 in the disk array 700 in the first embodiment. In this case, the parameters in the lifetime management conducted in the first embodiment while taking a disk device as the unit should be altered to LU remaining lifetime. If an LU that is less in LU remaining life than some watermark is found, disk devices included in the LU should be detected and processing of determining whether automatic migration is present should be conducted for each of the disk devices.

According to the present invention, it becomes possible to provide a mixture of disk devices differing in, for example, lifetime and remaining lifetime, and manage them in the same disk array. Furthermore, it is possible to determine the user's use of a volume while considering the reliability of the disk devices included in the array. Furthermore, it is possible to determine the user's use of a volume while considering the performance of the disk devices included in the array. Furthermore, it becomes possible to provide a mixture of disk devices differing in control scheme, and manage them in the same disk array.

Furthermore, there is an effect that an ATA disk device can be connected to a fibre channel arbitrated loop, which is an interface for connecting a fibre channel disk device.

In addition, it becomes possible to provide automatic creation of LUs and lifetime management in the LU level with due regard to the performance and reliability of disk devices, and reduce the user's burden of management in the storage system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system for storing data, comprising
at least one first type disk devices each comprising a first type interface;
at least one second type disk devices each comprising a second type interface; and
a control unit coupled to said at least one first type disk devices and said at least one second type disk devices,
wherein said at least one second type disk devices are configured to execute a different type command from a command executed by said at least one first type disk devices, and
wherein at least one first type RAID groups are formed from said at least one first type disk devices, and at least one second type RAID groups are formed from said at least one second type disk devices.

2. The storage system according to claim 1, wherein said at least one first type disk devices are FC disk devices each comprising an FC interface, and said at least one second type disk devices are ATA disk devices each comprising an ATA interface.

3. The storage system according to claim 1, wherein said control unit is configured to create said at least one first type RAID groups and said at least one second type RAID groups, based on an interface type of each disk device in said storage system.

4. The storage system according to claim 3, wherein said control unit is configured to distinguish between said at least one first type disk devices and said at least one second type disk devices, and create at least one RAID group for each type of disk devices.

5. The storage system according to claim 4, wherein said control unit is configured to detect an interface type of each disk device coupled to said control unit, and create said at least one first type RAID groups and said at least one second type RAID groups according to the detected interface type of each disk device.

6. The storage system according to claim 5, wherein said control unit is configured to issue a command to each disk devices coupled to said control unit in order to detect the interface type of each disk device, and receive information associated with an interface type from each disk device in response to said command.

7. A storage system according to claim 1, wherein at least one first type logical storage areas are formed in said at least one first type RAID groups, and at least one second type logical storage areas are formed in said at least one second type RAID groups.

8. The storage system according to claim 1, wherein said control unit includes a first type drive interface part communicatively coupled to said at least one first type disk devices and a second type drive interface part communicatively coupled to said at least one second type disk devices.

9. The storage system according to claim 8, wherein said control unit is configured to determine a type of command to be issued to a target disk device of said command, according to an interface type of said target disk device.

10. The storage system according to claim 2, further comprising: a first chassis including said FC disk devices;
a second chassis including said ATA disk devices; and
an FC loop coupled to said first chassis and said second chassis, via said FC loop, each of said FC disk devices and said ATA disk devices is coupled to said control unit.

11. The storage system according to claim 10, wherein said second chassis is coupled to said control unit via said first chassis and said FC loop, and said second chassis further includes an FC-ATA conversion interface, which converts a command for FC disk devices into a command for ATA disk devices to issue the convened command to an ATA disk device in said second chassis.

12. The storage system according to claim 2, further comprising:
a first chassis including said FC disk devices; and
a second chassis including said ATA disk devices, which is coupled to said control unit via an FC loop,
wherein said second chassis further includes an FC-ATA conversion interface, which converts a command received from-said control unit via said FC loop to a command for an ATA disk device and issues the converted command to an ATA disk device in said second chassis.

13. A storage system comprising:
a plurality of first type disk devices each including a first type interface;
a plurality of second type disk devices each including a second type interface; and
a control unit comprising a first type device interface part coupled to said first type disk devices and a second type device interface part coupled to said second type disk devices,
wherein said second type disk devices are configured to execute a different type of command from a command executed by said first type disk devices,
wherein said control unit is configured to receive an I/O command from a computer coupled to said storage system, determine a type of command for issuing to a target disk device, in which target data of the received I/O command is stored, based on an interface type of said target disk device, and issue the determined type command to said target disk device,
wherein said control unit is configured to detect an interface type of each disk device coupled to said control unit, and determine a type of command for issuing to said target disk device according to the detected interface type of said target disk device,
wherein said control unit has a drive management table in which information indicating the detected interface type of each disk device is recorded, and said control unit is configured to determine a type of command based on the information recorded in said drive management table, and
wherein said control unit is configured to control setting of a first type RAID group including said first type disk devices and setting of a second type RAID of group including said second type disk devices according to said drive management table.

14. A storage system comprising;
first type disk devices accessed via first type interfaces;
second type disk devices accessed via second type interfaces; and
a control unit coupled to the first type disk devices and the second type disk devices,
wherein the control unit manages interface types of the first type disk devices and the second type disk devices, and configures a first type disk group with the first type disk devices and a second type disk group with the second type disk devices based on the interface types, and
wherein a first type logical unit is configured in the first type disk group and a second type logical unit is configured in the second type disk group.

15. A storage system according to claim 14,
wherein the control unit obtains information relating to the interface types of the first type disk devices and the second type disk devices, and manages the interface types based on the obtained information.

16. A storage system according to claim 15,
wherein the control unit obtains the information relating to the interface types from the first type disk devices and the second type disk devices.

17. A storage system according to claim 16,
wherein the control unit issues a command to the first type disk devices and the second type disk devices, and obtains the information relating to the interface types in response to the command.

18. A storage system according to claim 14,
wherein the first type interfaces are FC interfaces and the second type interfaces are ATA interfaces.

19. A storage system according to claim 18,
wherein the first type disk group is an FC type RAID group configured with FC type disk devices, and the second type disk group is an ATA type RAID group configured with ATA type disk devices.

20. A method for configuring a logical unit in a storage system, which includes first type disk devices having first type interfaces, second type disk devices having second type interfaces, and a control unit coupled to the first type disk devices and the second type disk devices, comprising;

selecting plural disk devices based on interface types of the first type disk devices and the second type disk devices;

configuring, by the control unit, a disk group by using the selected plural disk devices, so that a first type disk group, being different from a second type disk group configured by the second type disk devices, is configured by the first type disk devices; and configuring, a logical unit by using the first type disk group, so that a first type logical unit, being different from a second type logical unit configured by the second type disk group, is configured.

21. A method for configuring a logical unit according to claim 20, further comprising;

obtaining information relating to the interface types of the first type disk devices and the second type disk devices, and wherein the control unit configures the disk group based on the information relating to the interface types.

22. A method for configuring a logical unit according to claim 21, wherein the control unit issues a command to the first type disk devices and the second type disk devices, and obtains the information relating to the interface types in response to the command.

23. A method for configuring a logical unit according to claim 20, wherein the disk group is a RAID group.

24. A method for configuring a logical unit according to claim 20, wherein the first type interfaces are FC interfaces and the second type interfaces are ATA interfaces.

* * * * *